US012694064B2

(12) United States Patent
Edwards et al.

(10) Patent No.: US 12,694,064 B2
(45) Date of Patent: Jul. 28, 2026

(54) AMBIENT DATA COLLECTION TO CREATE REAL-TIME RELEVANT USER CONTENT

(71) Applicant: AT&T Intellectual Property I, L.P., Atlanta, GA (US)

(72) Inventors: Gregory W. Edwards, Austin, TX (US); James H. Pratt, Round Rock, TX (US); Eric Zavesky, Austin, TX (US); Robert Moton, Jr., Alpharetta, GA (US); Adrianne Binh Luu, Atlanta, GA (US); Ari Craine, Marietta, GA (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/965,390

(22) Filed: Dec. 2, 2024

(65) Prior Publication Data

US 2026/0154349 A1 Jun. 4, 2026

(51) Int. Cl.
| | |
|---|---|
| *G06F 16/00* | (2019.01) |
| *G06F 16/387* | (2019.01) |
| *G06F 16/9035* | (2019.01) |
| *G06F 16/908* | (2019.01) |
| *G06F 16/909* | (2019.01) |

(52) U.S. Cl.
CPC ........ *G06F 16/9035* (2019.01); *G06F 16/387* (2019.01); *G06F 16/908* (2019.01); *G06F 16/909* (2019.01)

(58) Field of Classification Search
CPC ...................................................... G06F 16/387
See application file for complete search history.

(56) References Cited

U.S. PATENT DOCUMENTS

| | | | | |
|---|---|---|---|---|
| 2014/0316220 A1* | 10/2014 | Sheldon | ............... | A61B 5/0205 |
| | | | | 600/301 |
| 2024/0419747 A1* | 12/2024 | Kallman | ............... | G06F 16/951 |

* cited by examiner

*Primary Examiner* — Ajith Jacob
(74) *Attorney, Agent, or Firm* — Guntin & Gust, PLC; John G. Rauch

(57) ABSTRACT

Aspects of the subject disclosure may include, for example, receiving a user-generated query from user equipment. In response to the user-generated query, obtaining consumption data within a geographic region of the user equipment, determining an environmental profile of the user equipment from the consumption data, and generating content for presentation at the user equipment that is responsive to the user-generated query and relevant to the environmental profile. Other embodiments are disclosed.

20 Claims, 18 Drawing Sheets

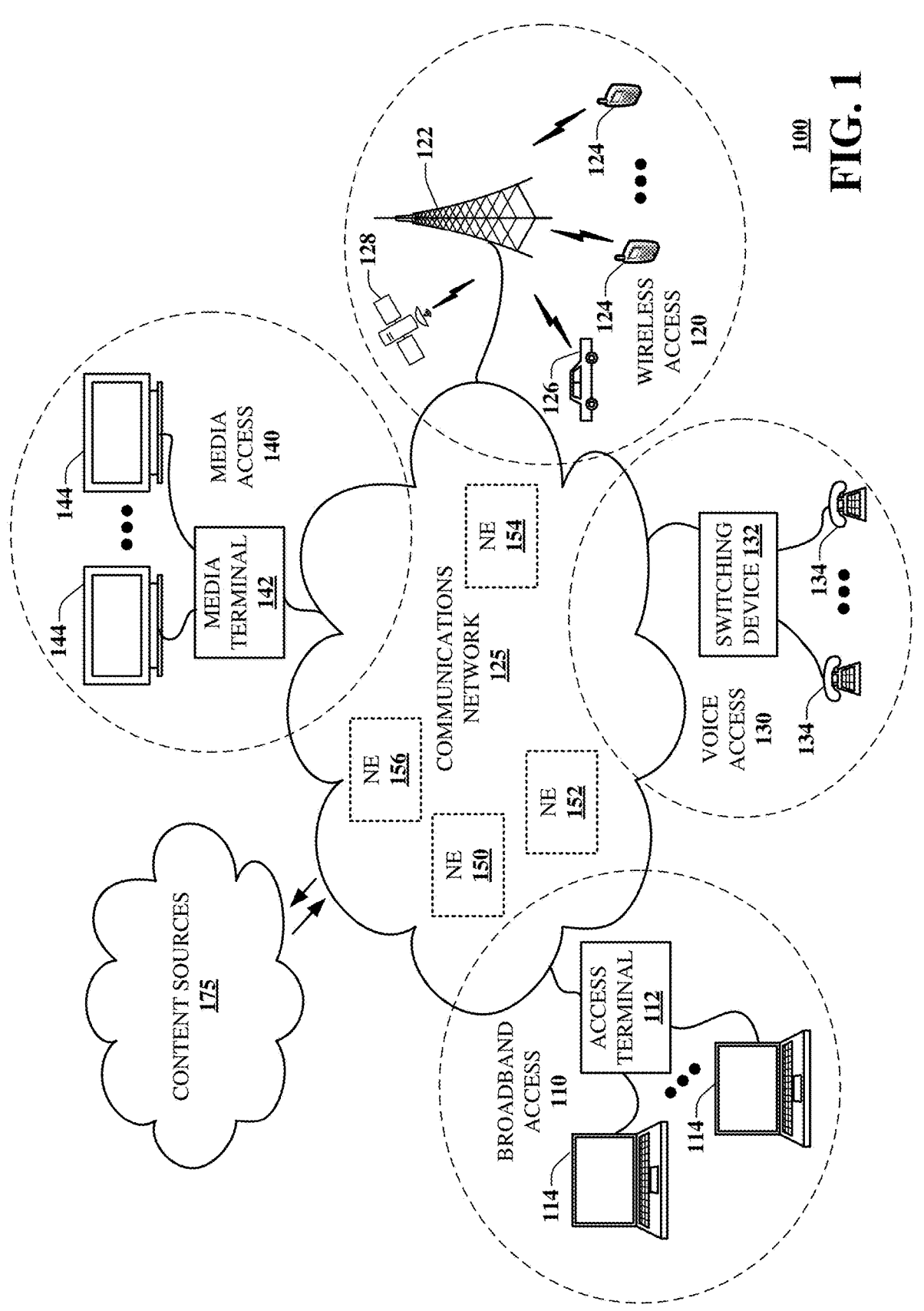
100    FIG. 1

204

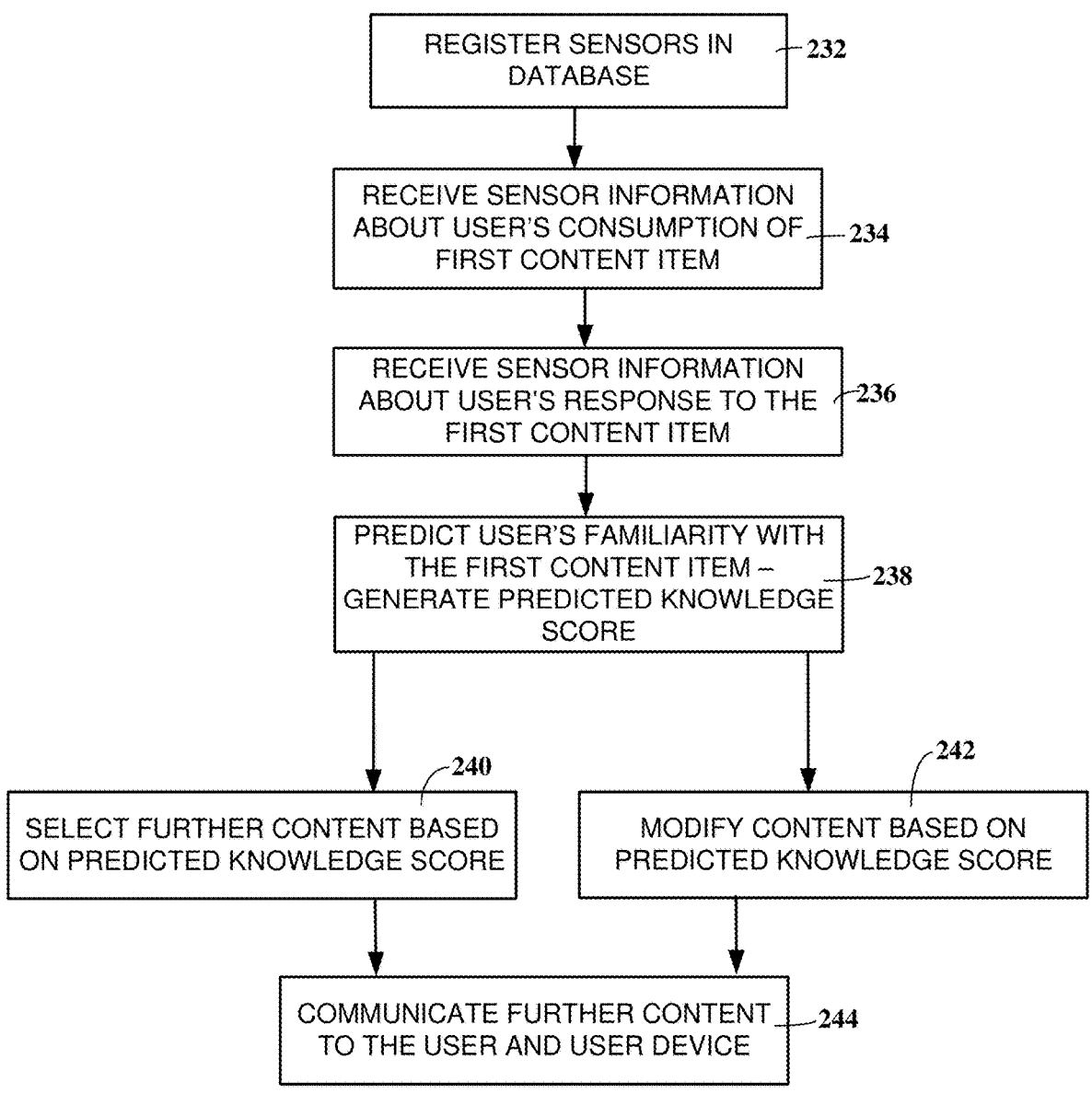

REGISTER SENSORS IN DATABASE ⌐232

RECEIVE SENSOR INFORMATION ABOUT USER'S CONSUMPTION OF FIRST CONTENT ITEM ⌐234

RECEIVE SENSOR INFORMATION ABOUT USER'S RESPONSE TO THE FIRST CONTENT ITEM ⌐236

PREDICT USER'S FAMILIARITY WITH THE FIRST CONTENT ITEM – GENERATE PREDICTED KNOWLEDGE SCORE ⌐238

SELECT FURTHER CONTENT BASED ON PREDICTED KNOWLEDGE SCORE ⌐240

MODIFY CONTENT BASED ON PREDICTED KNOWLEDGE SCORE ⌐242

COMMUNICATE FURTHER CONTENT TO THE USER AND USER DEVICE ⌐244

AMBIENT DATA COLLECTION TO CREATE REAL-TIME RELEVANT USER CONTENT

FIELD OF THE DISCLOSURE

The subject disclosure relates to a method and apparatus for generating content relevant to an ambient environment in a vicinity of user equipment.

BACKGROUND

Individuals today are surrounded by vast amounts of information from digital devices, environmental sensors, and personal interactions, often lacking contextual relevance. Current systems struggle to collect and analyze real-time data from a user's environment, leading to missed opportunities for timely and useful information delivery. Existing solutions frequently overlook the user's historical interactions and preferences, resulting in repetitive or irrelevant content that causes frustration and reduces effectiveness. Additionally, the lack of real-time analysis for generating personalized content based on specific queries and environmental conditions leaves users without the necessary information to make informed decisions.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 2L depicts an illustrative embodiment of a method in accordance with various aspects described herein.

DETAILED DESCRIPTION

Figure 2A:
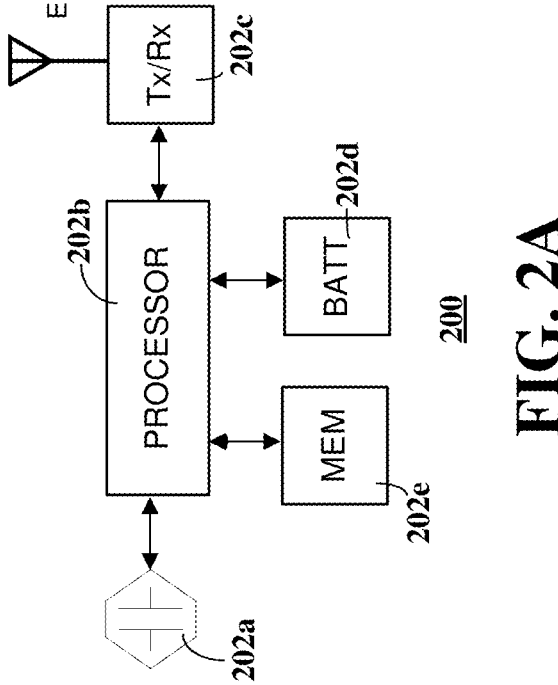
FIG. 2A is a block diagram illustrating an example, non-limiting embodiment of a sensor functioning within the communication network of FIG. 1 in accordance with various aspects described herein.

The subject disclosure describes, among other things, illustrative embodiments for a system and method for collecting data describing a user's ambient environment. Such data may be collected by a network node in a data network for the purpose of analysis supplementing content provided to a user via user equipment.

One or more aspects of the subject disclosure describes a device that includes a processing system with a processor and a memory. The memory stores executable instructions that, when executed by the processing system, facilitate various operations. These operations include registering one or more sensors in a database and receiving sensor data from the one or more sensors. The device also receives a user-generated query from user equipment. In response to the user-generated query, the device determines an ambient environment based on a threshold range associated with the location of the user equipment using the sensor data. The device then generates content for presentation at the user equipment that is responsive to the user-generated query and relevant to the ambient environment.

One or more aspects of the subject disclosure describes a non-transitory, machine-readable medium that includes executable instructions. When these instructions are executed by a processing system that includes a processor, they facilitate various operations. These operations include receiving sensor data from one or more sensors and receiving a user-generated query from user equipment. In response to the user-generated query, the processing system determines an ambient environment associated with a threshold range of the location of the user equipment using the sensor data. The processing system then generates content for presentation at the user equipment that is responsive to the user-generated query and relevant to the ambient environment.

One or more aspects of the subject disclosure describes a method that involves receiving a user-generated query from user equipment by a processing system that includes a processor. In response to the user-generated query, the processing system obtains consumption data within a geographic region of the user equipment. The processing system then determines an environmental profile of the user equipment from the consumption data. Finally, the processing system generates content for presentation at the user equipment that is responsive to the user-generated query and relevant to the environmental profile.

Referring now to FIG. 1, a block diagram is shown illustrating an example, non-limiting embodiment of a system 100 in accordance with various aspects described herein. For example, system 100 can facilitate in whole or in part collecting sensor data about a user in an environment, collecting information about the user's response to a content item, and predicting the user's familiarity with a further content item based on the user's response to the content item. In particular, a communications network 125 is presented for providing broadband access 110 to a plurality of data terminals 114 via access terminal 112, wireless access 120 to a plurality of mobile devices 124 and vehicle 126 via base station or access point 122 (and/or via satellite 128), voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices. In various embodiments, the satellite 128 can be configured for bi-directional communication with one or more access points, with one or more base stations, and/or with one or more mobile devices (e.g., direct-to-cell). In various embodiments, the satellite 128 can comprise a Low Earth Orbit (LEO) satellite or a Geostationary Orbit (GEO) satellite.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In many areas served by communication networks such as the communications network 125 of FIG. 1, there are available various sensors which collect and make available information about a location or an ambient environment. FIG. 2A is a block diagram illustrating an example, non-limiting embodiment of a sensor 200 functioning within the communications network 125 of FIG. 1 in accordance with various aspects described herein. The sensor 200 in the exemplary embodiment includes a sensor device 202a, a processor 202b, a memory 202e, and communication circuit 202c. The components of the sensor 200 may be powered by a battery 202d or other energy source. Components of the sensor 200 may be contained in a suitable housing which may, for example, provide weather resistance for outdoor applications. Other embodiments of sensor 200 may include other or additional elements for performing particular functions.

The sensor device 202a may be any device that collects information about an environment in which the sensor 200 is located. Examples of such a sensor device 202a include a camera which produces still images or video files or a video feed of a scene where the sensor 200 is located. The camera may include various types of cameras, such as image, video, infrared, thermal, and others and combinations of these. Another example of such a sensor device 202a is a microphone which is sensitive to audio in the vicinity of the sensor 200 and produces an analog signal or digital data representative of the sound.

Other examples of such sensor devices 200a measure or detect an ambient condition. One example of such a sensor device 202a is a pressure sensor which detects a pressure or force applied to the pressure sensor by another object or substance near the sensor 200 and produces an analog signal or digital data representative of the force. Another example of such a sensor device 202a is a touch sensor which detects a touch or contact, by a human or other, and produces an analog signal or digital data representative of the touch or contact. Another example of such a sensor device 202a is a light sensor that detects light or other ambient energy in the location of the sensor 200 and produces an analog signal or digital data representative of the light. Another example of such a sensor device 202*a* is a motion sensor which detects a motion applied to the sensor 200 and produces an analog signal or digital data representative of the motion. Another example of such a sensor device 202*a* is a temperature sensor which detects ambient temperature or another temperature in the vicinity of the sensor 200 and produces an analog signal or digital data representative of the temperatures. Any other type of sensor or combination of sensors may be included as the sensor device 202*a*.

The processor 202*b* may be part of a processing system which cooperates with data and instructions stored in the memory 202*e* to control operation of the sensor 200. The processor 202*b* may include one or more processors or microcontrollers or other data processing systems. The processor 202*b* may, for example, receive analog signals from the sensor device 202*a* and convert the analog signals to digital data. In other embodiments, the processor 202*b* may receive digital data from the sensor device 202*a*. The digital data may be stored in the memory 202*e* or be provided to the communication circuit 202*c*. Further, the processor 202*b* may control functions of the sensor device 202*a* such as by turning on and off the sensor device 202*a* and modulating controllable aspects of the sensor device such as a relative sensitivity of a light sensor or touch sensor.

Further, the sensor device 202*a* may be associated with further control functions that may be managed by the processor 202*b*. In an example, the sensor device 202*a* includes a video camera mounted on a motor-controlled fixture that may be actuated to direct the video camera toward a selected direction. The processor 202*b* may receive signals from a remote source, via the communication circuit 202*c*, and in turn, generate control signals to actuate one or more motors and direct the camera to the selected direction. The processor 202*b*, or the sensor 200, may be location aware. For example, the processor 202*b* may receive location information from another source, such as a Global Positioning System (GPS) receiver of the communication circuit 202*c*, and determine location of the sensor 200 based on the location information.

The communication circuit 202*c* includes any suitable circuitry for communication of data and other information between the sensor 200 and a remote source or destination. In one example, the communication circuit 202*c* includes a cellular radio which may operate in conjunction with equipment of wireless access 120 (FIG. 1) to provide information related to the output of the sensor device 202*a* to a remote location over a cellular network such as a fifth generation (5G) cellular network, sixth generation (6G) cellular network or other radio network. The communication circuit 202*c* may also include short-range wireless communications capabilities not requiring a network, such as Wi-Fi® or Bluetooth®. Bluetooth® is a registered trademark owned by the Bluetooth Special Interest Group. Wi-Fi® is a registered trademark of the Wi-Fi Alliance. As noted, the communication circuit 202*c* may include a GPS radio or other circuit for receiving position-finding data for use in determining a location of the sensor 200. In another example, the communication circuit 202*c* may provide wireline communication such as over an Ethernet® connection to a remote source or destination. Ethernet is a registered trademark of Xerox Corporation.

The information communicated by the communication circuit 202*c* may include uplink information based on information sensed by or collected by the sensor device 202*a*, such as data forming a video feed from a video camera. The information communicated by the communication circuit 202*c* may include downlink information provided to the sensor 200 to control some aspect of the sensor 200, such as motor control signals to control a motor which directs the view of the video camera to a scene of interest or actuation signals to turn on or turn off the sensor device 202*a* or to control some feature of the sensor device 202*a*.

The battery 202*d* provides operating power to the components of the sensor 200. The battery 202*d* may be a depletable, rechargeable energy storage element. In embodiments, the battery 202 may be replaced by or may supplement a hard-wired connection to electrical mains.

Sensors such as the sensor 200 may be located in a variety of areas for collecting sensed information. The sensed information may be made available to remote destinations for use by various users. Such users may be exposed to a variety of information in the user's ambient environment. Such information may come from conversations, media such as television and radio, electronic or online sources such news feeds to a smartphone or other handheld device, and other sources. Sensors in the vicinity of the user may detect the information in the user's ambient environment. Sensor 200 may be an integral part of user equipment (e.g., smartphone, laptop, etc.) of a user, and/or may be discoverable sensors that can be accessed by the user equipment wirelessly through a Wi-Fi or Bluetooth connection, or through a communication link from a cellular base station.

Data about the information describing a user's ambient environment may be collected by a network node for the purpose of analysis to predict elements of the user's knowledge. Knowledge elements may be predicted based on real world or electronically presented content to which the user is exposed. The user's knowledge prediction may be improved by detecting data confirming the user's consumption of the content. Such detection may be done in part by sensors such as the sensor 200 of FIG. 2A. Subsequent content presentation to the user may be modified based on the knowledge prediction.

The collected data or knowledge relates to what the user has been exposed to, and not necessarily what the user remembers. Further, the information may relate to how many times particular information was shared with someone else. The information that describes data and knowledge that that someone has been exposed to enables a prediction about what the user knows at any one time. That information may be useful to the user and to others so that subsequent ways of communicating information to the user can be done most efficiently.

A problem exists in that a user may be presented with electronic content that does not consider the user's set of knowledge. That is, a user may be presented with content that the user already has knowledge of, has already seen, or has already been exposed to in some other manner, such as hearing it in a conversation.

Because of this, users are continually presented with content that either they do not wish to be presented with again, or which is otherwise unnecessary. This is also a problem for the creator or provider of the content since the presentation of their unwanted or unnecessary content to a user may create a negative association between the user and the content creator or provider. On the other hand, if content is presented to the user and they interact positively with it, such interaction may be an indication that the user desires additional related content.

Thus, a solution is needed for a system that predicts a user's knowledge based on their exposure to and consumption of a first content in order to revise if and how a second content is presented to the user. In embodiments, the user and an application may utilize a network node that serves as an Ambient Data Capture Server. This function may be provided as a service or a paid service by a carrier provider, a network provider, or other connection provider or a partner of such a provider or network operator.

Figure 2B:
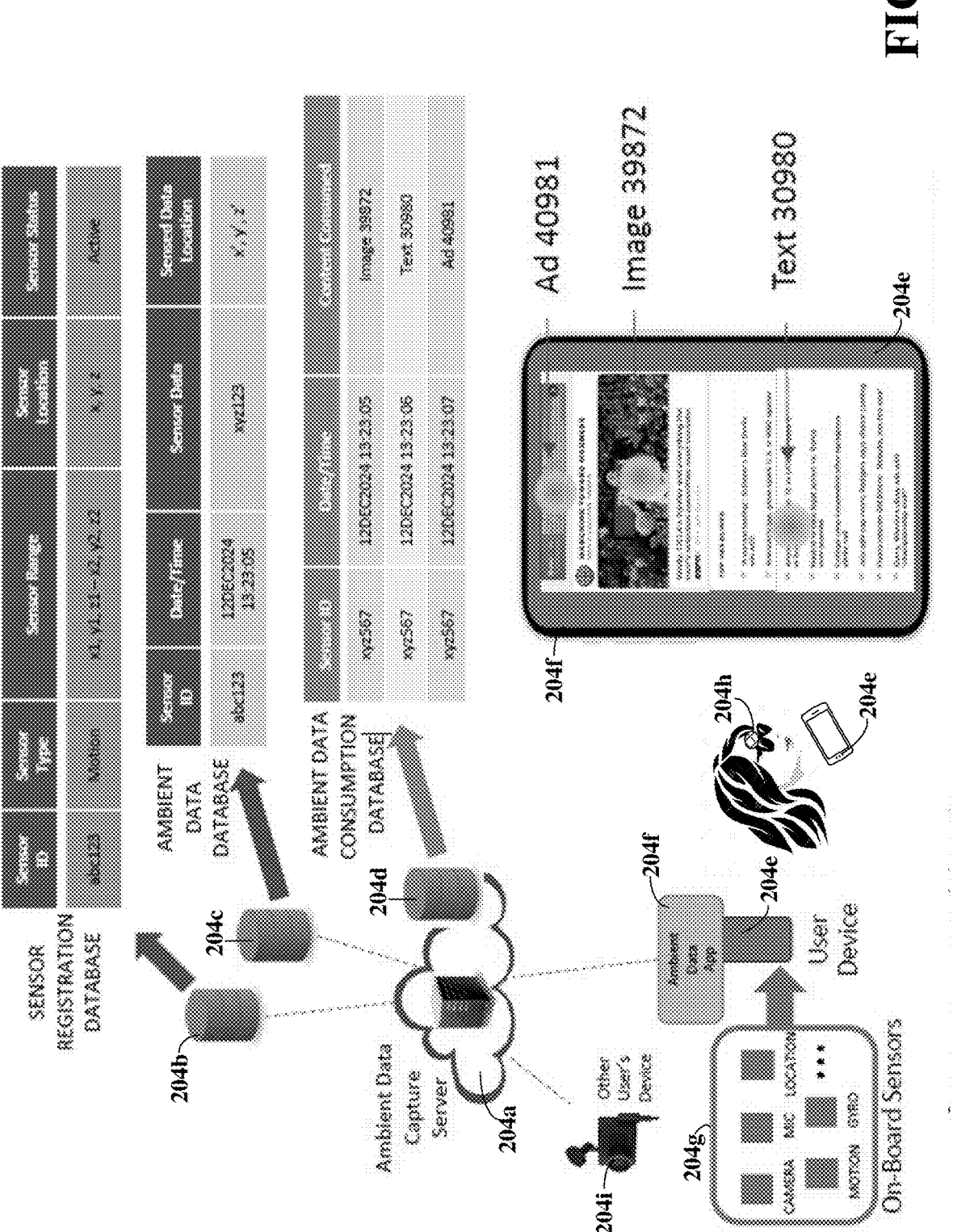
FIG. 2B is a block diagram illustrating an example, non-limiting embodiment of a system 204 functioning within the communications network of FIG. 1 and in conjunction with one or more sensors such as sensor of FIG. 2A in accordance with various aspects described herein.

FIG. 2B is a block diagram illustrating an example, non-limiting embodiment of a system 204 functioning within the communication network 125 of FIG. 1 and in conjunction with one or more sensors such as sensor 200 of FIG. 2A in accordance with various aspects described herein. The system 204 may provide a method for predicting a user's knowledge based on the user's exposure to and consumption of a first content in order to revise if and how a second content is presented. A network node provides the intelligence to permit such determination of a user's existing knowledge and experience and prediction of the user's knowledge. The user's knowledge prediction may be improved by detecting data confirming the user's consumption of the content and subsequent content presentation to the user may be modified based on the knowledge prediction. In the example embodiment of FIG. 2B, the system 204 includes a server 204a, a sensor registration database 204b, an ambient data database 204c, and an ambient data consumption database 204d. Further, in the example implementation of FIG. 2B, the system 204 includes a user device 204e.

The user device 204e may be any suitable device such as a smartphone or tablet computer or other wireless device. The user device 204e is location aware. Toward that end, the user device 204e may include a Global Positioning System (GPS) or other global navigation system radio receiver for determining the location of the user device 204e and, therefrom, the location of the user. Generally, the user device 204e may be a device such as a smartphone, tablet computer or other computer which is handheld or otherwise travels with the user. The user device 204e includes functional features including an ambient data application 204f.

The system 204 interacts with one or more sensors such as sensor 200 which may be configured as illustrated in FIG. 2A. Moreover, the user device 204e includes a number of on-board sensors 204g which may have any of the aspects of sensor 200. In the example, the on-board sensors 204g form function units of the user device 204e for sensing one or more aspects of operation of the user device 204e. In the illustrated example, the on-board sensors 204g include a camera, a microphone, a location sensor such as a GPS circuit, a motion sensor and a gyroscope.

The on-board sensors 204g may include other types of sensors as well. In some embodiments, the on-board sensors 204g include wearable sensors 204h. In the illustrated example, wearable sensor 204h includes a camera associated with the eyeglasses worn by the user. Other examples of wearable sensors 204h include a body-worn camera and a wristwatch. Such wearable sensors 204h each may have a full complement of sensors including cameras, motion sensors, a microphone, a location sensor, a gyroscope, and others. These examples of the on-board sensors 204g and wearable sensors 204h are intended to be exemplary only.

The user device 204e is in radio communication with a remote network such as a cellular network. Example cellular networks include 5G, 6G and follow-on cellular mobility networks, Wi-Fi networks and other radio networks that provide two-way data communication for the user device 204e. In the example, the user device 204e includes a radio transceiver, a processing system including a processor and memory, and a user interface. The radio transceiver provides radio communication with the cellular network or other communication network. In other embodiments, the user device 204e may be, for example, a connected vehicle and include one or more radio transceivers adapted for communication. The user device 204e may access the radio transceivers of the vehicle and use other features of the connected vehicle such as an in-dash user interface.

The user interface of the user device 204e or the in-dash user interface may include, for example, a touch sensitive display or a keyboard. The display may be used for showing textual information such as news feeds, textual messages from other users, etc. The display may further be used for showing graphical information such as maps of a region. The display may further be used for showing images such as photos taken by a camera sensor or provided from a news source or other user, a video file of images or a live video feed from a camera associated with a news source, publisher or other user, for example. Views on the display may be controlled by touch-sensitive feature or an associated keyboard. The user interface may further include a speaker system for audio playback of audio received from another source or user. The user interface may further include a microphone for receiving spoken commands and other audible information.

Sensors including the on-board sensors 204g and the wearable sensors 204h may be in communication with the server 204a for implementing the ambient sensor system. The sensors may broadcast their availability to users under certain conditions and make themselves available to collect ambient data on behalf of a user. The sensors including the on-board sensors 204g and wearable sensors 204h may communicate with the server 204a in any suitable manner, including wirelessly and over a wireline network. The sensors may advertise their capabilities, their location and any other suitable information to the server 204a. Alternatively, the server 204a may poll the individual sensors in any suitable manner to collect necessary information from the sensors. The server 204a may in turn convey to a user and user device 204e information about sensor capabilities and other information.

Information from the sensors may be maintained in the sensor registration database 204b. The sensor registration database 204b may be in data communication with the server 204a over any suitable network connection. In embodiments, the information of the sensor registration database 204b may be stored and read under control of the server 204a.

FIG. 2B illustrates one example of the information that may be stored in the sensor registration database 204b for a particular sensor. A record of the sensor registration database 204b in this example includes a sensor identifier and sensor type information defining the type of the sensor, such as camera, microphone, temperature sensor, etc. A database record may further include sensor location information about the location of the sensor and range information for the sensor. The sensor location information may be determined by the sensor itself and be reported to the sensor registration database 204b, for example. The range information may define location coordinates within which the sensor is able to capture data. A record may further include a sensor status for the sensor and a network address for the sensor. For example, a status of active may indicate that the sensor is currently actively recording data; a status of inactive may indicate that the sensor is offline or not currently collecting data.

Any other suitable information about the sensor may be collected and stored at the sensor registration database 204b. For example, the sensor or the server 204a may provide and store in the database a description of the information available from the sensor and examples of the sensor information and its presentation. For example, if the sensor is a video sensor with a view of a particular location, the description field of the sensor record in the sensor registration database 204*b* may include a still photo of the view serving as a thumbnail photo. The still photo and other sensor description information may be provided to a user accessing the ambient data application 204*f*.

Thus, the user may be equipped with a user device 204*e* such as a smart device that has speech recognition capabilities and is equipped with an ambient data application 204*f*. The user device 204*e* is also location aware. The ambient data application 204*f* may be in communication with an ambient data capture server network node formed by or including the server 204*a*.

Further, the one or more types of sensors are within the proximity of the user's location at any given time. In addition, there may be one or more cameras and microphones that may also serve as sensors and may also be used to capture ambient data. The sensors may include on-board sensors 204*g* that are directly controlled by the user and exist on the user device 204*e* or other devices, such as wearable sensors 204*h* of a wearable device controlled by the user. The sensors may also include external sensors such as sensor 204*i* that may belong to other users or be publicly owned, such as a traffic camera. These external sensors, including cameras or microphones and others, are not directly managed or controlled by the user. Rather, they register their availability to be a part of the system 204 with the server 204*a* and the sensor registration database 204*b*. Each external sensor, including cameras and microphones, may also be location aware and may have network communication capabilities to register information describing their capabilities in the sensor registration database 204*b*. All sensors may continually perform or refresh their registrations on a periodic basis such that the active pool of available sensors to collect data describing a user's ambient environment at any given point in time is known to the system 204 including the server 204*a*. In addition, devices controlled by other users, such as a dashcam, may register as sensors. So, for example, another user's device such as sensor 204*i* may register in the sensor registration database 204*b* to collect data.

The ambient data database 204*c* may receive and store sensor data reported by the sensors. Active sensors may collect and report their sensor data describing ambient conditions within their sensor range on a continuous or semi-continuous basis, or according to any other schedule. In doing so, streams of sensor data from the sensors may be collected by the ambient data capture server 204*a* and stored in the ambient data database 204*c*. Ambient data collected by the ambient data capture server 204*a* may include a sensor identifier, a date and timestamp, and location information for the sensed ambient data. Moreover, the sensor data stored in the ambient data database 204*c* may include audio data, image data, video data, or other data such as data describing the conditions detected by each sensor. Thus, sensors that are active are collecting and reporting data about ambient conditions, and continually updating. There is in effect a continual sensing and recording of ambient data around each sensor, for future use, by the server 204*a* in the ambient data database 204*c*.

The ambient data consumption database 204*d* may be accessed by the server 204*a* to store and retrieve information about content the user has been exposed to, such as on the user device 204*e*. In example, embodiments, the user may also be equipped with one or more devices such as the user device 204*e* or a wearable with a wearable sensor 204*h* that can detect and collect data describing how the user experiences their environment. That is, not only can the user device 204*e* or another device detect and collect data describing the user's environment, but it can also more specifically collect data describing "content" within the environment that the user experiences. This content can include electronically presented content such as content presented on the user device 204*e* or another external device.

For example, a camera on the user device 204*e* may track the user's gaze as the user's eyes consume content on the device screen. The ambient data application 204*f* on the user device 204*e* may associate the content presented on the coordinates of the display at the time the user's gaze is there and the ambient data capture server 204*a* may store information about the content presented to the user in the ambient data consumption database 204*d*. The ambient data consumption database 204*d* may, for example, store a record of the user's consumption of the content, as shown. Any suitable information may be stored in the record of the user's consumption in the database. In the example, each record in the ambient data consumption database 204*d* includes sensor identification information, a data and timestamp, and information about the content consumed. The information about the content consumed may include a brief description, such as "image," "text," or "ad" for an advertisement. Further, information about the content consumed may include any other suitable identifier such as an identifying number. The visual content may be any type of content such as text, image, video, etc., presented by any type of application on the user device 204*e* or detected by another sensor such as a wearable sensor.

In some examples, then, a sensor of the user device 204*e*, a wearable sensor 204*h*, or other sensor closely associated with the user is used to track content consumption. This may provide information about how the user consumes information and the device used for such consumption. The sensors may include or employ, for example, a device for tracking eyeball position to locate the user's gaze on a display or other content source, including signs and video displays near the user, to learn what attracts the user's attention. Gaze information may include the time duration during which the user's gaze stays in a particular location. Gaze information may tell if the user looks at pictures and not text in content items, or if the user likes to read bulleted items rather than paragraphs of text. The sensors may include a microphone or other audio sensor to detect what the user is listening to on the user device 204*e* or another device or what the user is saying. Any necessary permission required to monitor the user, collect, store and process user information, should be obtained.

Thus, the ambient data consumption database 204*d* stores information about the user. The stored information includes data about what content is consumed, how the content is consumed and when the content is consumed by the user. Further, the stored data allows inferences and predictions about future user content consumption. In some example embodiments, the server 204*a* or other network node may include an artificial intelligence or machine learning (AI/ML) module to predict user content consumption. This may include predicting the types and amounts of content consumed, as well as any other information.

Exemplary types of AI and ML algorithms that could be utilized in the subject disclosure include Support Vector Machines (SVM), which are used for classification and regression tasks by finding the optimal hyperplane that separates data into different classes, and Decision Trees, which are tree-like models used for decision-making and classification by splitting data into branches based on feature values. Random Forests, an ensemble learning method that combines multiple decision trees to improve accuracy and reduce overfitting, and Neural Networks, a set of algorithms modeled after the human brain used for tasks such as image and speech recognition, are also relevant. Convolutional Neural Networks (CNN) are particularly effective for image and video recognition tasks due to their ability to capture spatial hierarchies in data, while Recurrent Neural Networks (RNN) are designed for sequential data, such as time series or natural language processing, and can maintain context through their internal memory. K-Nearest Neighbors (KNN) is a simple, instance-based learning algorithm used for classification and regression by comparing new data points to the k-nearest neighbors in the training set. Naïve Bayes is a probabilistic classifier based on Bayes' theorem, often used for text classification and spam detection. Gradient Boosting Machines (GBM) are an ensemble technique that builds models sequentially, each new model correcting errors made by the previous ones, commonly used for classification and regression tasks. Generative Adversarial Networks (GANs) are a type of neural network used for generating new data samples that are similar to a given training set, often used in image generation and enhancement tasks. Other variants of AI/ML are contemplated by the subject disclosure.

Figure 2C:
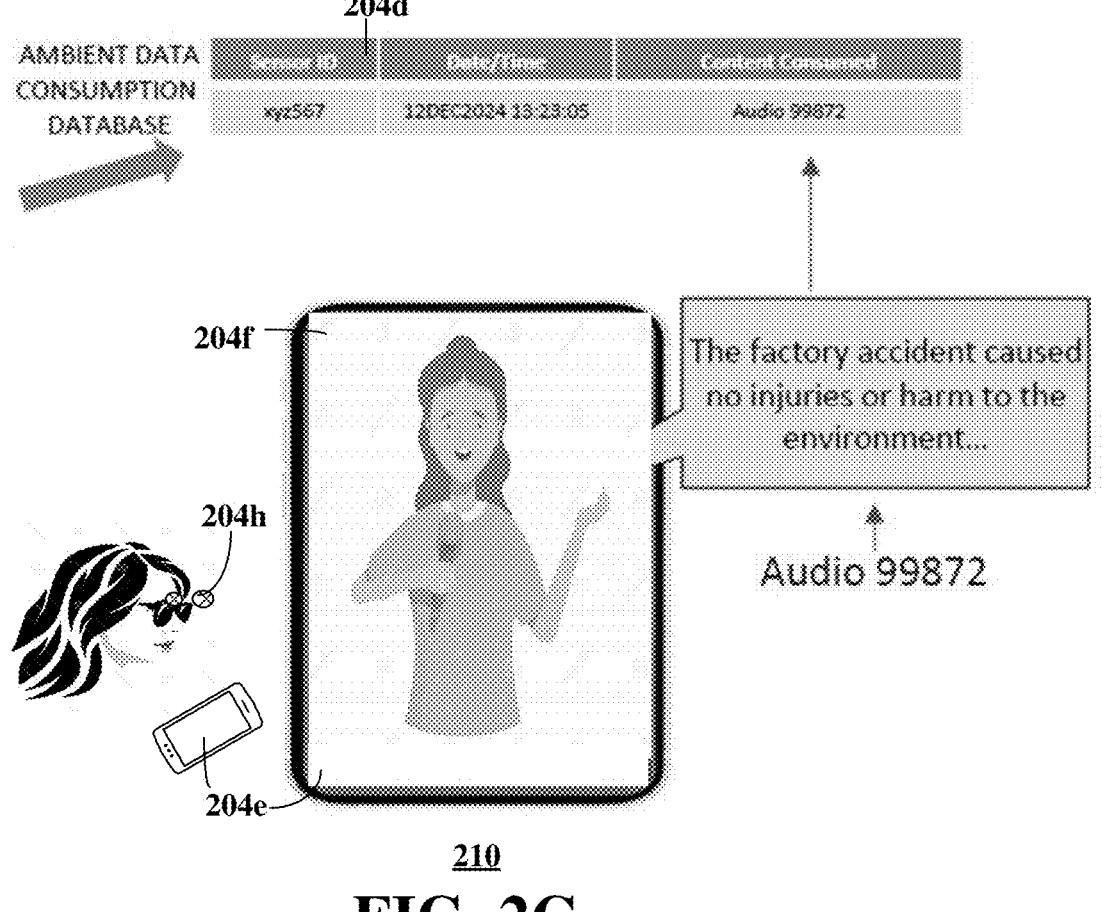
FIG. 2C depicts an illustrative embodiment of a user display that may be produced by the system of FIG. 2B in accordance with various aspects described herein.

FIG. 2C depicts an illustrative embodiment of a user display 210 that may be monitored by the system 204 of FIG. 2B in accordance with various aspects described herein. The user display 210 is shown in association with the user device 204e as held or worn by the user. Further in the example embodiment, the user may be equipped with a wearable sensor 204h such as a camera, microphone or combination of these associated with the eyeglasses worn by the user.

In the example of FIG. 2C, the content item is on-device. That is, the user is viewing or listening to a content item on the user device 204e. The exemplary content item includes video images of a news reporter holding a microphone and describing a factory accident. The reporter's spoken words are illustrated in the speech bubble next to the user display 210 in the drawing figure. However, in an actual implementation, the user device 204e displays the video on a display screen and plays audio corresponding to the reporter's words through a speaker of the user device 204e or through a wearable device such as headphones or earbuds. The user device may monitor and record the content item.

Information of the content item, such as audio files or video files or both, may be saved as one or more records in the ambient data consumption database 204d. Moreover, a transcription or a summary description of the content item may be saved. In an example, an AI/ML module operating either on the user device 204e or on the server 204a may prepare a summary description of what it sees or hears of the content item and save the summary description in the ambient data consumption database 204d. In another example, the AI/ML module may include a speech to text tool which prepares a transcription for storage in the ambient data consumption database 204d. The content item, the summary description, or both may be saved with a suitable identifier of descriptor such as "Audio 99872."

Figure 2D:
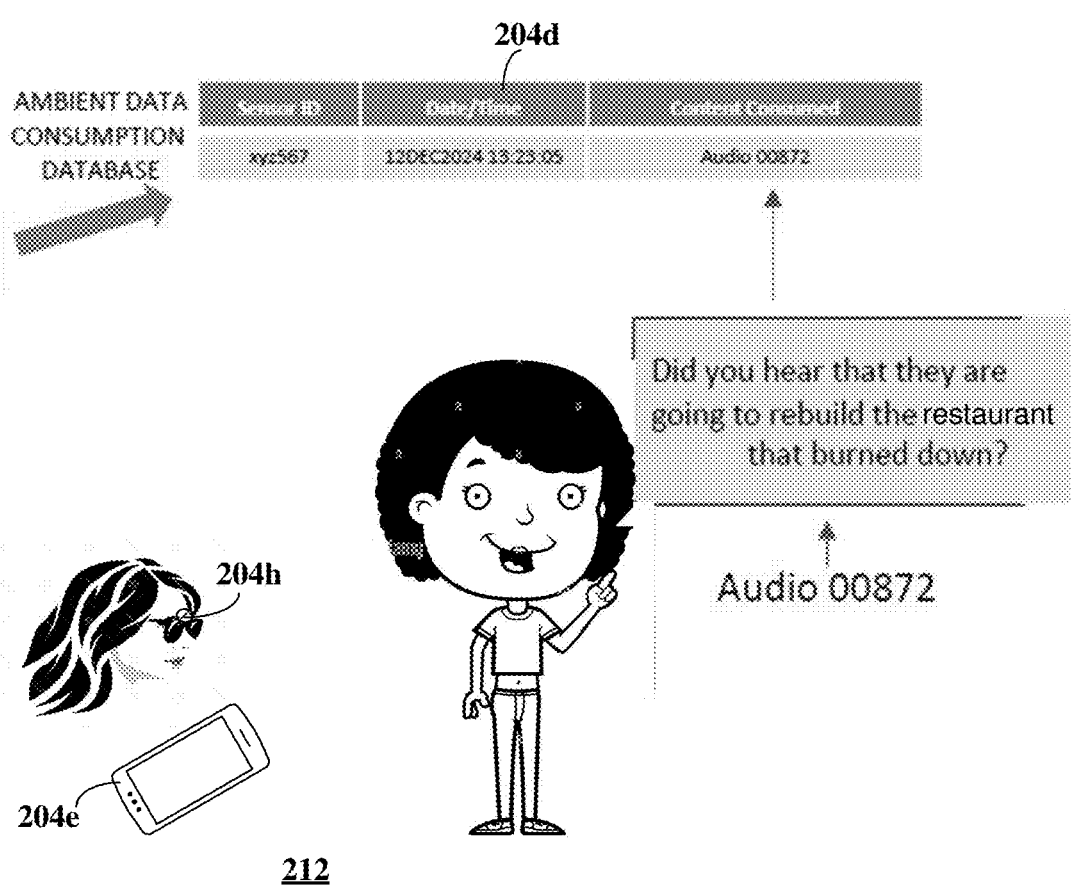
FIG. 2D depicts an illustrative embodiment of a user interaction that may be monitored by the system of FIG. 2B in accordance with various aspects described herein.

FIG. 2D depicts an illustrative embodiment of a user interaction 212 that may be monitored by the system 204 of FIG. 2B in accordance with various aspects described herein. The user interaction 212 is shown in association with the user device 204e as held or worn by the user. Further in the example embodiment, the user may be equipped with a wearable sensor 204h such as a camera, microphone or combination of these associated with the eyeglasses worn by the user.

In the example of FIG. 2D, the content item is off-device. That is, the user is engaged in a conversation with a woman, viewing or listening to another individual in the ambient environment with the user. The user device 204e or a wearable sensor 204h may detect or predict that the user is in a conversation. The user device 204e or a wearable sensor 204h may capture video of the user interaction 212, audio of the user interaction 212, or a combination of these. Thus, audio content that the user consumes in real life may be captured and stored as consumed content. This may include anything that the user hears, for example in a face-to-face conversation. On-board and/or external sensors may be used to capture this content.

Similar to the embodiment of FIG. 2C, information or data related to the user interaction 212 may be saved in the ambient data consumption database 204d. For example, an audio recording or a video recording may be automatically made at the user device 204e, at the wearable sensor 204h or at the server 204a. The recording may be saved in the database with a suitable identifier such as Audio 00872 as in FIG. 2D. Moreover, a transcript may be made and saved or a summary may be made and saved.

In embodiments, the video or audio may be saved without reference to the identity of the recorded individual. This may be done to avoid having to obtain the individual's permission to record the conversation. In such an example, just the substance of what the user was told, that "the restaurant that burned down is going to be rebuilt," will be saved. In effect, a record is made and there is saved knowledge that the user was exposed to this information.

Figure 2E:
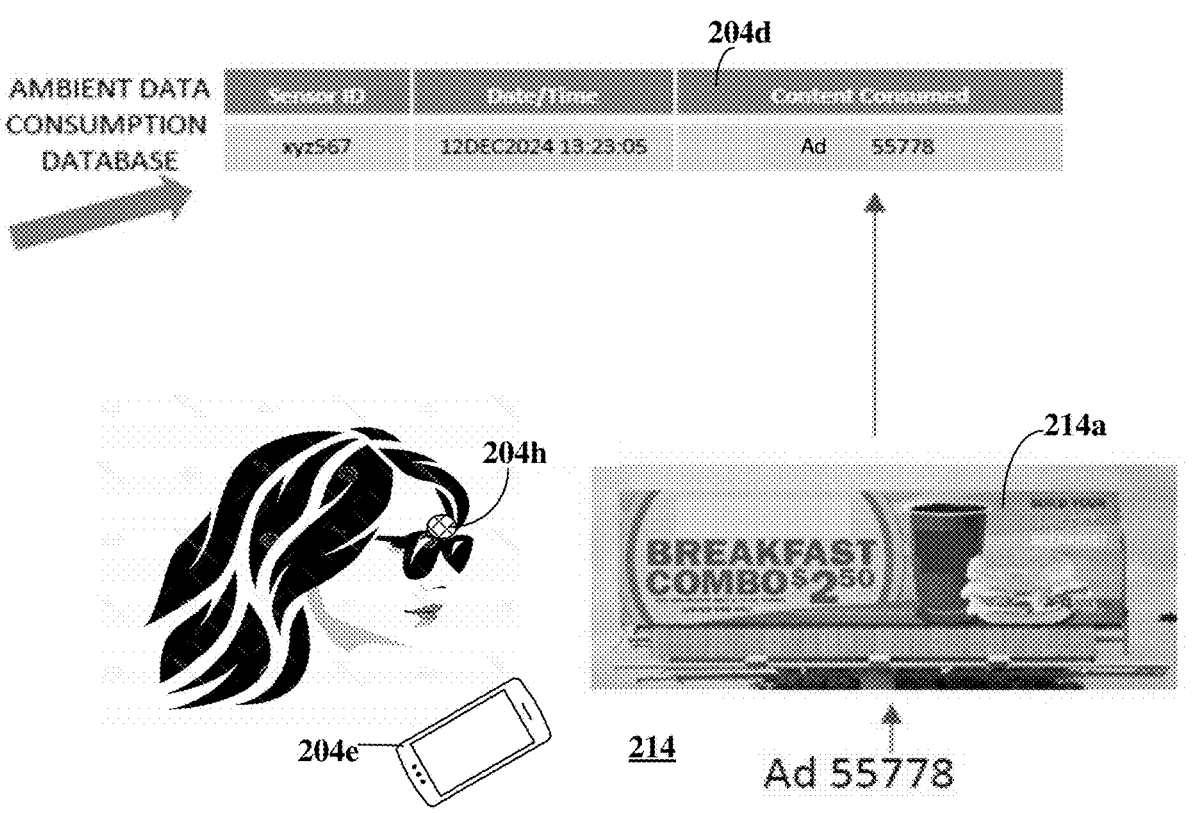
FIG. 2E depicts an illustrative embodiment of a user interaction that may be monitored by the system of FIG. 2B in accordance with various aspects described herein.

FIG. 2E depicts an illustrative embodiment of a user interaction 214 that may be monitored by the system 204 of FIG. 2B in accordance with various aspects described herein. The user interaction 214 is shown in association with the user device 204e as held or worn by the user. Further in the example embodiment, the user may be equipped with a wearable sensor 204h such as a camera, microphone or combination of these associated with the eyeglasses worn by the user.

Similar to the user interaction 212 in FIG. 2D, in the example of FIG. 2E, the content item is off-device. That is, the user is exposed to a publicly displayed advertisement 214a for a meal at a restaurant. Thus, visual images that the user consumes in real life may be captured and stored as consumed content. This may include anything that the user sees in this manner that may be detected and captured by an on-board sensor of the user device 204e or an external sensor such as a wearable sensor 204h. The ambient data capture server 204a may receive the sensor data over a network such as a cellular network and store the sensor data in the ambient data consumption database 204d as illustrated. The ambient data capture server 204a may then use the sensor data to estimate the user's line of sight for external sensors, or a line-of-sight video capture may be created by a user device camera such as the wearable sensor 204h. The user device 204e or the wearable sensor 204h may include a camera that mimics the user's line-of-sight, such as a dashcam or a wearable. Examples of wearable sensors may include a head-mounted camera or camera equipped eyewear.

In the example, the camera sensor captures what the user sees, including the advertisement 214a. Any suitable data or information may be captured by the camera sensors and conveyed to the server 204a and stored in the ambient data consumption database 204d. The user may control and set preferences for the system 204. Among those preferences may be a setting for, once an ad such as advertisement 214*a* has been seen or displayed, the ad is subsequently an excluded ad and is not displayed again. The exclusion may be for a pre-set time period, until the user removes the exclusion, or for any time duration specified by the user in the user preferences. The specified ad may be for a particular exact ad, for an advertised product or brand, or for a class of products (such as the class of "all restaurant meals," for example. Thus, in the future, the system 204 will respond to the user preferences when displaying such advertisements. For example, if the user is later viewing a social media feed on the user device 204*e* or another user device, the system 204 operates to block the presentation of the advertisement.

Figure 2F:
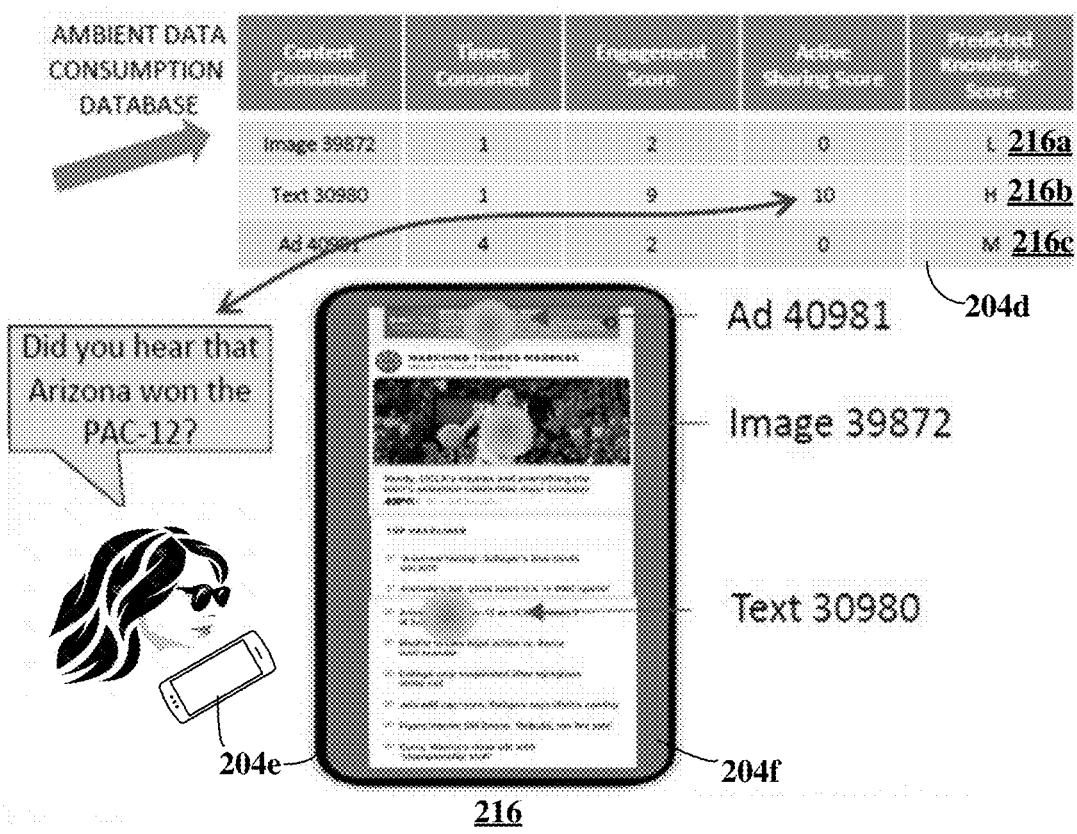
FIG. 2F depicts an illustrative embodiment of a user interaction that may be monitored by the system of FIG. 2B in accordance with various aspects described herein.

FIG. 2F depicts an illustrative embodiment of a user interaction 216 that may be monitored by the system 204 of FIG. 2B in accordance with various aspects described herein. The user interaction 216 is shown in association with the user device 204*e* as held or worn by the user.

In FIG. 2F, the ambient data capture server 204*a* has received data from sensors, processed the data and stored information in the ambient data consumption database 204*d*. In the example, the user has viewed several content items on the user device 204*e*. A first content item is designated Image 39872 and is displayed on the display screen of the user device 204*e*. The user device 204*e* detects the image and related information and generates sensor data that is provided to the ambient data capture server 204*a*. For example, the user device 204*e* may be operating under control of an ambient data application 204*f* (FIG. 2B) which monitors activity on the user device 204*e*. The ambient data capture server 204*a* receives the sensor data and processes the sensor data and stores information in database entry 216*a*.

In the example, the ambient data capture server 204*a* determines a number of times the first content item has been consumed, an engagement score and an active sharing score for the content item, as well as a predicted knowledge score. These determined values are stored in database entry 216*a*. In the example, the first content item has been consumed a single time, an engagement score of 2 has been calculated by the ambient data capture server 204*a*, an active sharing score of 0 has been calculated by the ambient data capture server 204*a*, and the predicted knowledge score having a value of low or "L" is entered in the database entry 216*a*. Any suitable technique may be used for determining the engagement score. For example, the ambient data application 204*f* operating on the user device may measure an amount of time during which the user viewed the first content item on the display of the user device 204*e*, for example by tracking the user's gaze when the user is viewing the user device 204*e*. The duration of the gaze on a particular content item, or any other factor, may be used to establish the engagement score. For example, if the user clicks on or selects a content item, the engagement score may be increased. If the user further follows links associated with the first content item, the engagement score may be further increased. If the user makes a purchase or other similar high-value activity, the engagement score may be further increased.

Any suitable information may be used by the ambient data capture server 204*a* and system 204 to determine an active sharing score. For example, if the user selects the content item to share it by electronic mail (email) or by text message or other channel, the active sharing score may be increased. If the user device 204*e*, or the ambient data application 204*f* operating on the user device 204*e*, detects the user speaking and recommending the first content item to another person, the active sharing score may be increased. If the user does not share the first content item in any way, the active sharing score may be decreased or remain at an initial value such as 0.

The user has also viewed a second content item, designated in FIG. 2F as Text 30980. The second content item is a news headline displayed among other headlines on the display screen of the user device 204*e*. The ambient data application 204*f*, for example, may collect data about the user's interaction with the second content item, such as a viewing time, any clicking on the second content item, etc. Based on the information collected by the ambient data application 204*f*, the ambient data capture server 204*a* determines, for example, a number of times consumed for the second content item and an engagement score for the second content item. An active sharing score may further be determined by the ambient data capture server 204*a* based on the user's actions with respect to the second content item. In this example, the user device 204*e* or other sensor detects the user commenting about the content of the second content item, saying "Did you hear that Arizona won the PAC-12?" about a sports result. The subject or details of the user's comment match or have a similarity to the text of the second content item. Based on this similarity, the ambient data capture server 204*a* may conclude that the user has recommended or otherwise shared the second content item and thus increases the active sharing score for the second content item. A predicted knowledge score may be determined for the second item and the determined values are entered by the ambient data capture server 204*a* in the ambient data consumption database 204*d* as second entry 216*b*.

Similarly, the user device 204*e* or the ambient data application 204*f* detects user engagement with a third content item, an advertisement designated as Ad 40981 in FIG. 2F. In the example, the advertisement has been shown to the user four times, corresponding to the number of times consumed, and entered in the ambient data consumption database 204*d* as third entry 216*c*. The ambient data application 204*f* may detect presentation of the advertisement to the user on the user device 204*e* and may maintain a count of the number of presentations of the advertisement. The ambient data application 204*f* may report this count information to the ambient data capture server 204*a*. Further, the ambient data application 204*f* may determine a degree of engagement by the user with the advertisement based on any suitable factors. The ambient data capture server 204*a* may determine an engagement score for the third content item and enter the value in the third entry 216*c* in the ambient data consumption database 204*d*. Further, the ambient data application 204*f* may report information about sharing of the third content item by the user to the ambient data capture server 204*a*. The ambient data capture server 204*a* in turn may determine an active sharing score for the third content item and enter the value in the third entry 216*c* in the ambient data consumption database 204*d*. Still further, the ambient data capture server 204*a* may determine a predicted knowledge score for the third content item which may then be entered in the third entry 216*c* in the ambient data consumption database 204*d*.

FIG. 2F illustrates an example of prediction of knowledge of the user based on collected information about the user's past exposure to information. By storing data describing the content to which the user is subjected in the ambient data consumption database 204*d*, the ambient data capture server 204*a* and the system 204 may use this captured data to generate a predicted knowledge score for each element of consumed content.

This prediction may be based on a number of factors and can be calculated using various means. The factors may include information such as how many times the content has been presented to the user and how engaged the user has been with the content based on sensed attention data such as eye contact with another person or with given data on a display such as the user device 204e or another display in the user's ambient environment. In a further example, the user's own generated content may be monitored after consuming the original content to detect if the user reinforces their knowledge of the content. Such reinforcement may occur, for example, through means such as forwarding the content or sharing the content in some other medium or relating the subject matter of the content to another party. This may be done for example, by creating either electronic content or, through real life content, such as spoken conversation, which contains content that is substantially the same as the original consumed content. Such information may be used to develop the active sharing score for the user for the content item. An item of information that is shared more widely or more frequently may produce a higher active sharing score for the user.

Any suitable AI/ML module or method may be implemented to form the prediction of user knowledge. The records stored in the ambient data consumption database 204d provide an input to the predictive model. For example, the AI/ML module may form a count of the number of times a particular item has been presented to or consumed by the user, or the number of times a similar item has been presented to or consumed by the user. Any available information may be used to develop an engagement score for the user and for an item, including for example, how long the user looks at an item or how often the user goes back to an item to view it again, or listen again, or consume it again.

Thus, the stored user data consumption information may be used to develop a predicted knowledge score as it relates to each piece of data or information consumed by the user. As noted, any suitable model may be used to develop the prediction or make use of the information in the database for the user. For example, a generative artificial intelligence model can be used in conjunction with the information stored for the user in the ambient data consumption database 204d to improve a user's experience with future data consumption. The future experience can be tailored based on the past collected information.

Generative AI is a type of artificial intelligence that creates new content. This content can take many forms, including text, images, music, and even code. Generative AI models are trained on massive amounts of data. This data could be text, images, or other forms of media, including the information in the ambient data consumption database 204d. Once trained, the model can generate new content that is similar to the data it was trained on. For example, a generative AI model trained on text data could be used to generate new articles and stories of interest to a user.

Figure 2G:
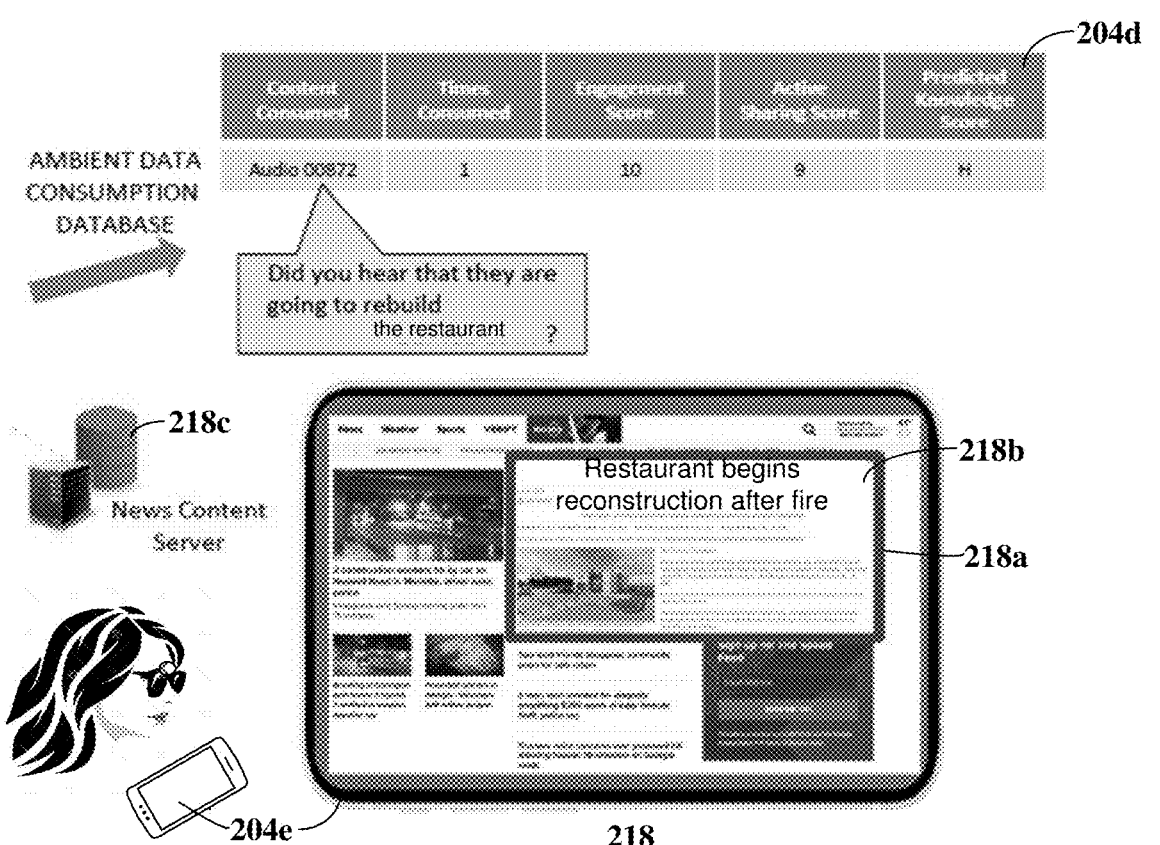
FIG. 2G depicts an illustrative embodiment of a user interaction that may be monitored by the system of FIG. 2B in accordance with various aspects described herein.

FIG. 2G depicts an illustrative embodiment of a user interaction 218 that may be monitored by the system 204 of FIG. 2B in accordance with various aspects described herein. The user interaction 218 is shown in association with the user device 204e as held or worn by the user.

FIG. 2G illustrates revision of subsequent content presentation based on user knowledge prediction. In embodiments, the user may subsequently access other content using the user device 204e or another device under control of system 204. An example of another content source is a news application 218a, as shown in the example of FIG. 2G, provided in conjunction over a communication network by a news content server 218c. In the example, the news application 218a includes a story 218b about rebuilding a restaurant that had burned down. In presenting this content, the news application 218a and the news content server 218c may consult the ambient data consumption database 204d to determine how to present any related news content that it has access to, based on the user's predicted knowledge score. Again, any of a number of calculation methods may be used to determine the user's predicted knowledge score.

In some embodiments, a new content item may be selected to present to the user at the user device. The new content item may be, for example, a preexisting news story, video file, audio file or other. Based on the user's predicted knowledge score, the new content item may be modified to better appeal to the user, based on the awareness or prediction by the system 204 of the user's knowledge level about the new content item, interest in the new content item, and other factors. In an example, a news story reporting a fire at a particular restaurant may be edited or updated to focus on plans to rebuild the restaurant and return the restaurant to business, based on a prediction that the user has already learned about the existence of the fire at the restaurant. Rather than provide redundant information to the user, the prediction that the user has a preexisting base of knowledge is used to tailor or customize the new content item provided to the user. The customized content item may then be transmitted over the communication network to the user device 204e.

In a further embodiment, the information developed by the system 204 may be provided to a third-party content provider for use in tailoring content for the user or customizing content items, based on the prediction of the user's knowledge. In the case of the restaurant news story, the predicted knowledge score, or information about the predicted knowledge score, may be provided by a network operator or a system operator to a news site or news aggregator to which the user subscribes or from which the user receives content. The news site or news aggregator, as a third party, may use the provided information about the predicted knowledge score to select and modify content and then provide that modified content to the user in due course. The network operator and the news site or news aggregator may have a business relationship to share information about the user in this manner.

In a further embodiment, the format of the new content item may be changed before forwarding to the user. For example, if the user initially reacted to a web page including a first content item such as a news story about the restaurant fire, the selected new content item may be a video file with a news report and still images or video of the progress to rebuild the restaurant. Thus, the awareness of the user's preexisting knowledge about the restaurant fire story is used to select and provide to the user further information, in a different format, which advances the user's knowledge to include additional details and information that occurred subsequent to the initial event of the story, the restaurant fire.

In an example, if the user has consumed the content or related content only a few times but has a high engagement score and active sharing score as recorded in the ambient data consumption database 204d, the related news content, for example, story 218b, may be presented prominently when the user requests news content. Alternately, the related news content such as story 218b may be pushed to the user. On the other hand, if the user later has consumed the content or related content many times and has stopped reading it and sharing it, while the predicted knowledge score is high, the user may be determined to be "burned out" on the topic, not otherwise interested, and future related content is not sent to the user.

Thus, when the system 204 presents further content to the user, the system 204 may access the information of the ambient data consumption database 204d. Based on the model information or score values stored in the ambient data consumption database 204d, the system 204 may modify how new content or future content is presented to the user at the user device 204e. In an example, the information of the database may be processed by an AI/ML module or model to determine user preferences. One preference may be for news stories with several illustrations or photographs. In that example, the system 204, in cooperation with the news content server 218c, will select or format future stories or other future content with more stories.

Thus, a page including story 218b, presented by the news application 218a, may look very different to different users reading the same story. The differences in appearance may depend on how the AI/ML module processes the new content before it is presented to the user, based on a prediction of the knowledge of the user.

Figure 2H:
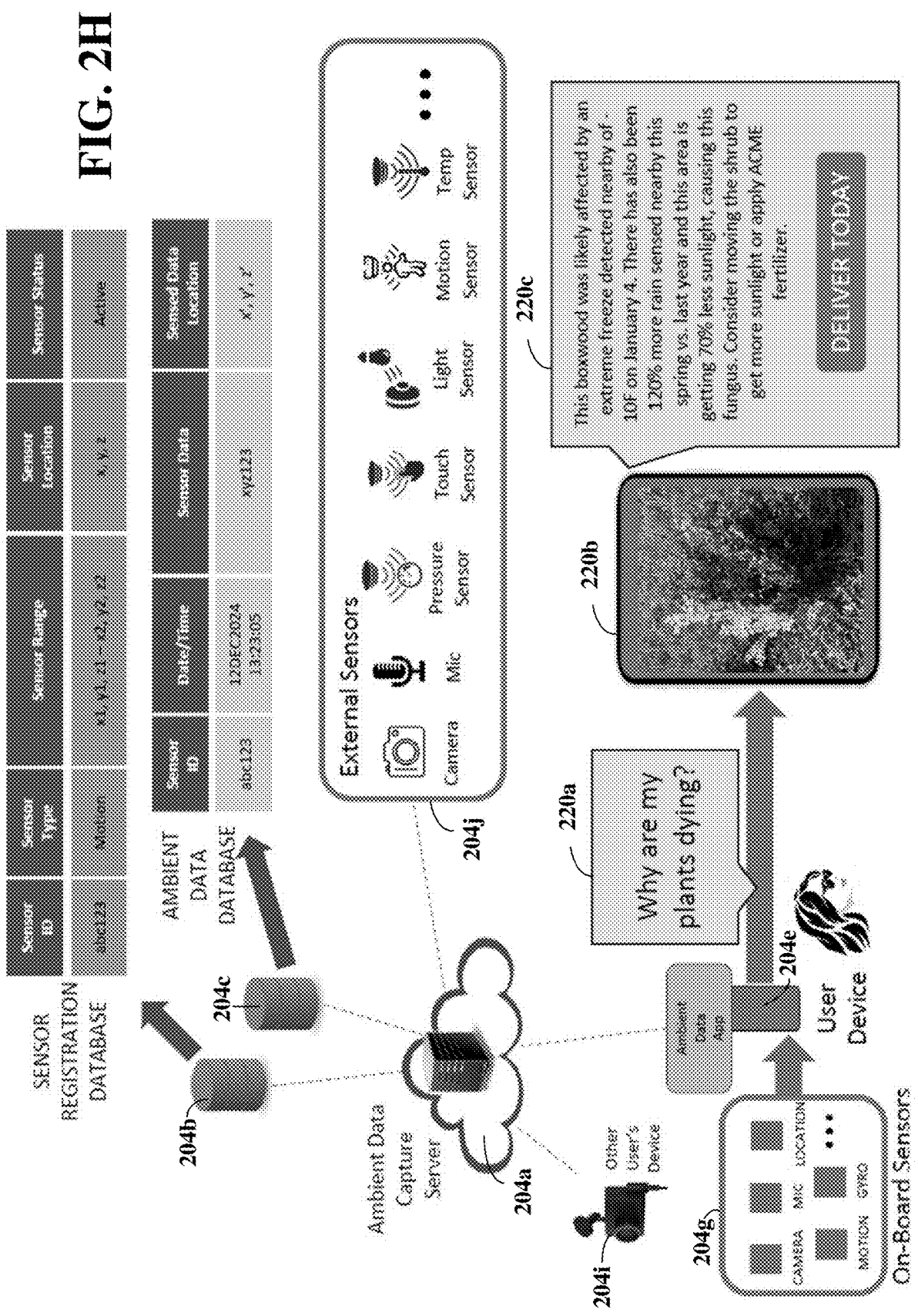
FIG. 2H depicts an illustrative embodiment for providing supplemental content that is relevant to an environment of a user issuing a query in accordance with various aspects described herein.

FIG. 2H depicts an illustrative embodiment for providing supplemental content that is relevant to an environment of a user issuing a query in accordance with various aspects described herein. FIG. 2H illustrates an embodiment of the system where a user-generated query 220a is processed to provide relevant supplemental content based on the user's ambient environment. The user device 204e, equipped with an ambient data application, sends a query 220a such as "Why are my plants dying?" with an image 220b (picture of the affected boxwood) to the ambient data capture server 204a. The ambient data capture server 204a, in communication with various sensors, collects and analyzes data from both on-board sensors 204g on the user device 204e and external sensors 204j within a geographic region where the user device 204e is located at the time of the query 220a. As will be illustrated by this embodiment, the external sensors 204j can provide the ambient data capture server 204a data during times before the ambient data capture server 204a receives the query 220a from the user device 204e. The external sensors 204j, which include cameras, microphones, pressure sensors, touch sensors, light sensors, motion sensors, and temperature sensors, register their data in the sensor registration database 204b.

The ambient data capture server 204a retrieves relevant sensor data from the ambient data database 204c and processes it to generate supplemental content 220c. The generated supplemental content 220c, which includes an analysis of the environmental conditions affecting the plants, is then presented to the user on the user device 204e. The supplemental content 22c is tailored to the user's query and the specific conditions detected by the external sensors 204j, providing a detailed explanation and actionable advice. As is evident from the response 220c, the ambient data capture server 204a has determined from past events (e.g., extreme freeze of −10 F on January 4, excess rain, and less sunlight) the cause of the boxwood damage. To make this determination, the ambient data capture server 204a retrieved sensor data from the external sensors 204j that predates the query 220a sent by the user device 204e. Accordingly, the ambient data capture server 204a can be configured to retrieve sensor data from any timeframe suitable for responding to the query. Additionally, the ambient data capture server 204a can be configured to not only identify a root cause associated with a query but also potential mitigation steps that may be taken by the user of the user device 204e (e.g., moving the shrub to get more sunlight and certain fertilizer). To perform these assessments, the ambient data capture server 204a can be configured with AI/ML models that can be trained to identify root cause and possible solutions.

Figure 2I:
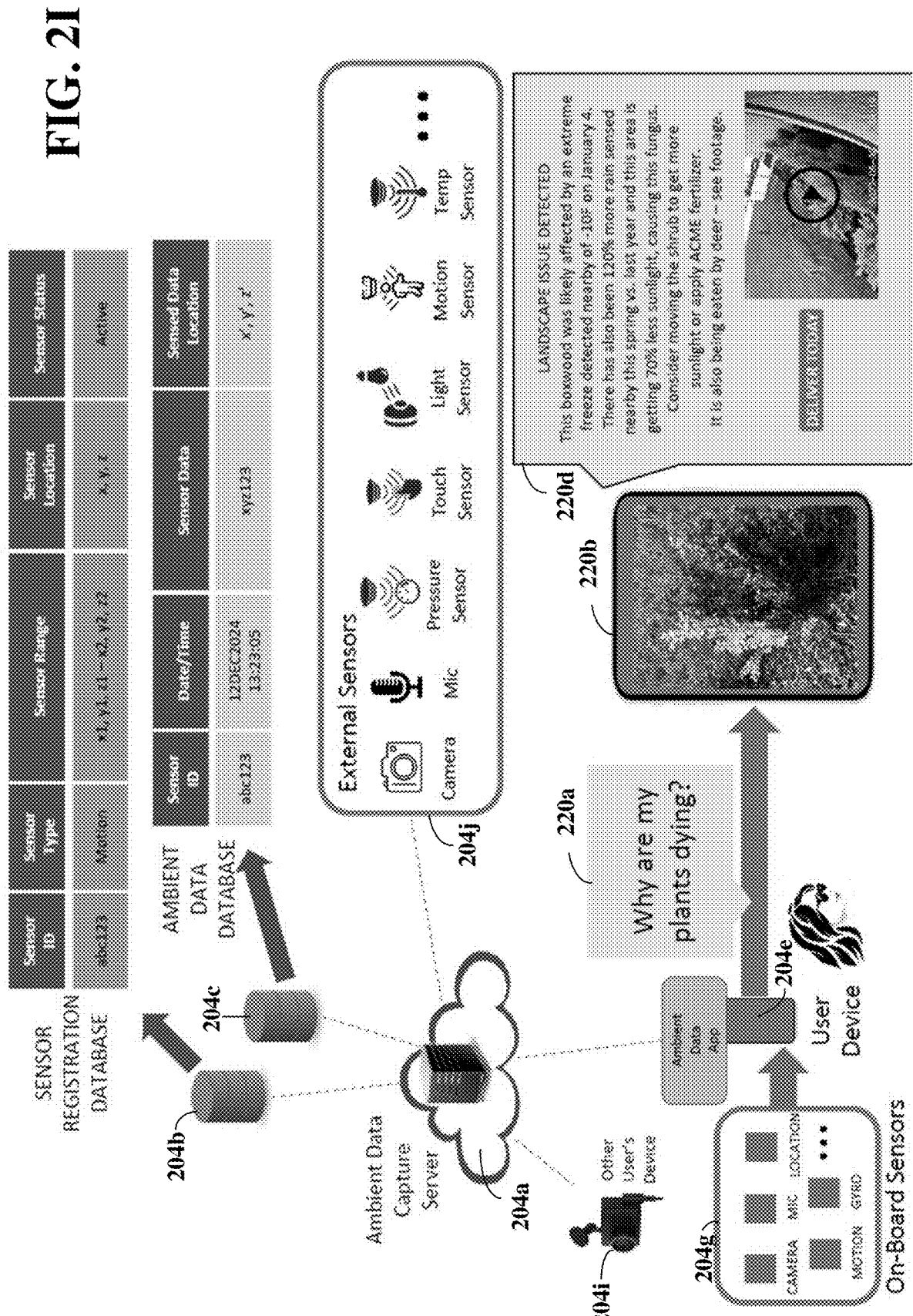
FIG. 2I depicts an illustrative embodiment for providing supplemental content that is relevant to an environment of a user issuing a query in accordance with various aspects described herein.

FIG. 2I depicts an illustrative embodiment for providing supplemental content that is relevant to an environment of a user issuing a query in accordance with various aspects described herein. FIG. 2I illustrates an embodiment of the system where a user-generated query 220a is processed to provide relevant supplemental content based on the user's ambient environment, similar to FIG. 2H. The user device 204e, equipped with an ambient data application, sends a query 220a such as "Why are my plants dying?" with an image 220b (picture of the affected boxwood) to the ambient data capture server 204a. The ambient data capture server 204a, in communication with various sensors, collects and analyzes data from both on-board sensors 204g on the user device 204e and external sensors 204j within a geographic region where the user device 204e is located at the time of the query 220a. The external sensors 204j, which include cameras, microphones, pressure sensors, touch sensors, light sensors, motion sensors, and temperature sensors, register their data in the sensor registration database 204b.

The ambient data capture server 204a retrieves relevant sensor data from the ambient data database 204c and processes it to generate supplemental content 220d. The generated supplemental content 220d, which includes an analysis of the environmental conditions affecting the plants, is then presented to the user on the user device 204e. The supplemental content 220d is tailored to the user's query and the specific conditions detected by the external sensors 204j, providing a detailed explanation and actionable advice. In this embodiment, the supplemental content 220d not only identifies the root cause of the issue (e.g., extreme freeze, excess rain, and less sunlight) but also includes additional information such as security footage showing deer eating the plants, thereby providing a comprehensive analysis and potential mitigation steps (e.g., moving the shrub to get more sunlight, applying ACME fertilizer, and addressing the deer issue). As noted earlier, the deer footage would have been from sensor data collected by the ambient data capture server 204a before the query 220a. Although sensor data is collected in relation to a threshold range (e.g., 50 meters) from a location of the user device 204e, the associated sensor data collected by the ambient data capture server 204a before the query 220a can be of a different time range from which the query 220a is received.

Figure 2J:
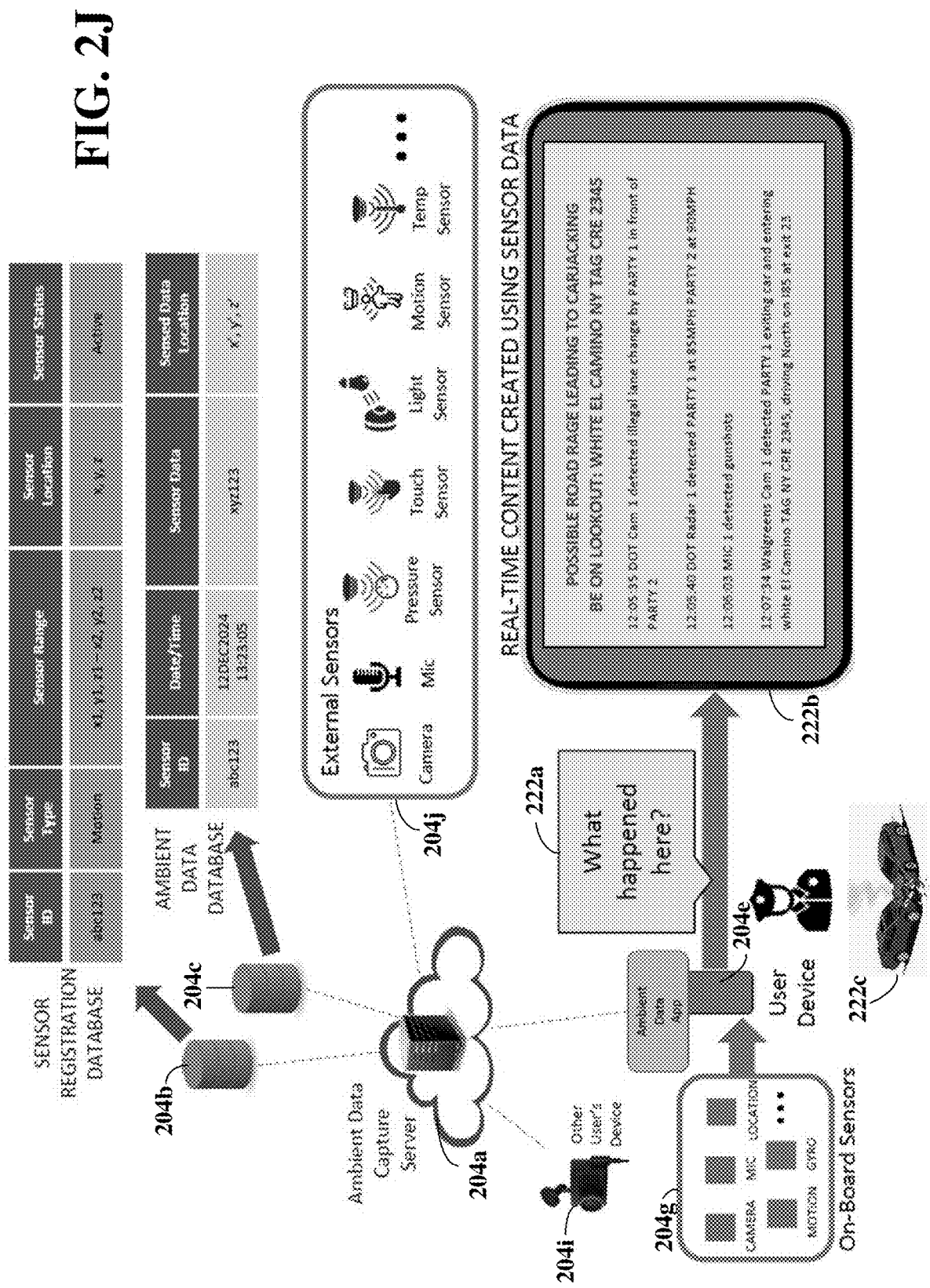
FIG. 2J depicts an illustrative embodiment for providing supplemental content that is relevant to an environment of a user issuing a query in accordance with various aspects described herein.

FIG. 2J depicts an illustrative embodiment for providing supplemental content that is relevant to an environment of a user issuing a query in accordance with various aspects described herein. FIG. 2J illustrates an embodiment of the system where a police officer makes a query 222a to determine what happened at a specific location. The user device 204e of the police officer, equipped with an ambient data application, sends the query 222a "What happened here?" with an image of a car accident 222c to the ambient data capture server 204a. The ambient data capture server 204a, in communication with various sensors, collects and analyzes data from both on-board sensors 204g on the user device 204e and external sensors 204j within a geographic region where the user device 204e is located at the time of the query 222a. The external sensors 204j, which include cameras, microphones, pressure sensors, touch sensors, light sensors, motion sensors, and temperature sensors, register their data in the sensor registration database 204b.

The ambient data capture server 204a retrieves relevant sensor data from the ambient data database 204c and processes it to generate supplemental content 222*b*. The generated supplemental content 222*b* includes a detailed timeline and analysis of the events leading to a possible road rage incident and carjacking. The content is presented to the police officer on the user device 204*e* and includes specific details such as:

12:05:35—DOT Cam 1 detected an illegal lane change by PARTY 1 in front of PARTY 2.

12:05:40—DOT Radar 1 detected PARTY 1 at 85 MPH and PARTY 2 at 90 MPH.

12:06:03—MIC 1 detected gunshots.

12:07:34—Walgreens Cam 1 detected PARTY 1 exiting a car and entering a white El Camino with NY TAG CRE 2345, driving north on 185 at exit 23.

This comprehensive analysis, based on data from the external sensors 204*j* and stored in the ambient data database 204*c*, provides the police officer with actionable information to understand the sequence of events and take appropriate action. In the present embodiment, the geographic range used for determining relevant sensor data can extend a long distance from the source location of the image of the car accident 222*c* sent by the user device 204*e* of the officer. The ambient data capture server 204*a* can determine that the location of the officer must be extended significantly to determine how this car accident occurred. Accordingly, although a threshold range (e.g., 50 meters) may be a default starting point for the ambient data capture server 204*a* to collect sensor data, it can expand this range significantly if further sensor data is needed based on the circumstances.

Figure 2K:
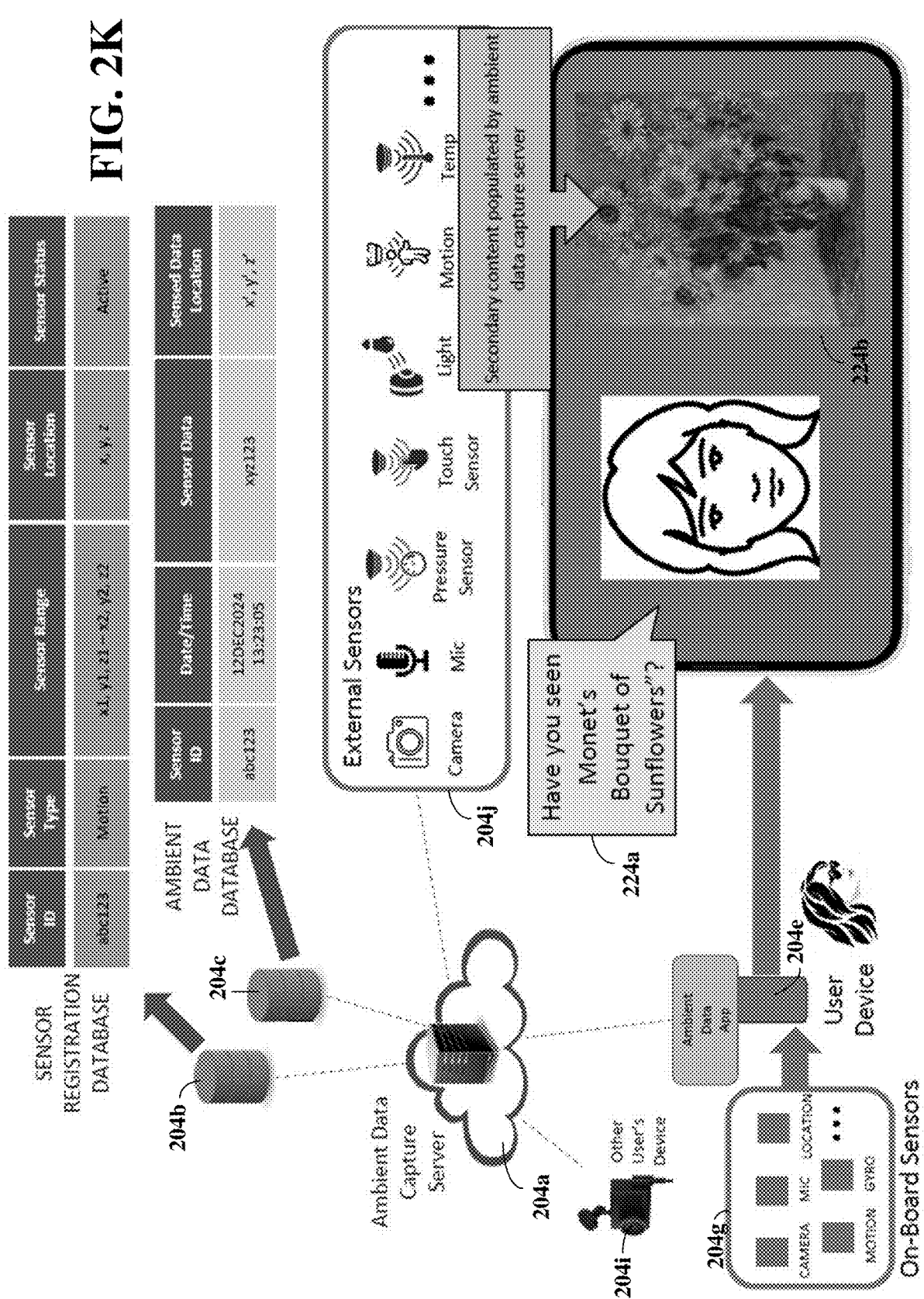
FIG. 2K depicts an illustrative embodiment for providing supplemental content that is relevant to an environment of a user issuing a query in accordance with various aspects described herein.

FIG. 2K depicts an illustrative embodiment for providing supplemental content that is relevant to an environment of a user issuing a query in accordance with various aspects described herein. FIG. 2K illustrates an embodiment of the system where a conversational interaction between two individuals prompts the generation of supplemental content. The user device 204*e*, equipped with an ambient data application, is in communication with the ambient data capture server 204*a*. The ambient data capture server 204*a* collects and analyzes data from both on-board sensors 204*g* on the user device 204*e* and external sensors 204*j* within a geographic region where the user device 204*e* is located. In this embodiment, the second user, using another device, makes a query 224*a* during a conversation, such as "Have you seen Monet's Bouquet of Sunflowers?"The ambient data capture server 204*a* retrieves relevant sensor data (e.g., audio from user device 204*e*) from the ambient data database 204*c* and processes it to generate supplemental content 224*b*. The generated supplemental content 224*b*, which includes an image of Monet's Bouquet of Sunflowers, is then presented to the first user on the user device 204*e*.

The system also determines a knowledge score for both individuals involved in the conversation to make the supplemental content more relevant and interesting. The knowledge score is based on historical content consumed by the users, as stored in the ambient data database 204*c*. Although not shown, the ambient data capture server 204*a* can determine from the knowledge score of the two individuals that they may have an interest in art museums and also post on the display of user device 204*e* when and where Monet's Bouquet of Sunflowers will be in exhibition. The ambient data capture server 204*a* may also determine availability of the user of user device 204*e* from calendar postings on the user device 204*e* and/or historical locations of the user of the user device 204*e* based on historical GPS data collected from the user device 204*e* by the ambient data capture server 204*a*. From this determination, the ambient data capture server 204*a* can also post on the display of the user device 204*e* tickets and costs for certain days and times to attend the exhibition.

Additionally, the ambient data capture server 204*a* can detect the activity of the user of the user device 204*e* to determine how further to enhance the supplemental content 224*b*. For example, the ambient data capture server 204*a* may detect from the on-board sensors 204*g* of the user device 204*e* that the user is located at a library, which has a reference section having one or more illustrative books on Monet art. In this embodiment, the ambient data capture server 204*a* can generate supplemental content providing the user instructions on where to locate such books.

This comprehensive analysis ensures that the supplemental content 224*b* is tailored to the context of the conversation and the ambient environment, enhancing the interaction between the individuals.

FIG. 2L depicts an illustrative embodiment of a method 230 in accordance with various aspects described herein. The method 230 may be performed at any suitable location such as a network node in a communication network or a data processing network. In an example, the method 230 may be performed at a network node including a data processing system having a processor and memory and responsive to instructions to implement the method 230. In some embodiments comma the method 230 may be implemented by an ambient data capture server in data communication with a plurality of ambient environmental sensors. The method 230 may be performed at a device which is configured to receive data from a plurality of sensor such as sensor 200 over a communication network and to provide content items to a user associated with a user device. The method 230 may be initiated in response to any suitable input, including activation by a user requesting access to a content item or by a system to begin collecting sensor information from sensors in data communication with the network.

At step 232, the method 230 includes registering a plurality of sensors in a database. The sensors may include sensors such as sensor 200 which may operate independently in an environment. In other examples, the sensors may include sensors associated with equipment or a device such as a user device. For example, a television may include a camera and microphone to collect information about and from people in the environment with the television. In other examples, a user device in the form of a smartphone may include various sensors to detect and track user interaction with the user device and actions and responses of users in the vicinity of the user device.

In some embodiments, the data from the sensors may be received and stored in a database such as sensor registration database 204*b* (FIG. 2B). Any suitable information from the sensors may be saved in records of the database. Such information may include sensor identification information, sensor type and sensor status information, as well as sensor data corresponding to a measured or recorded quantity.

At step 234, the method 230 includes receiving sensor data and other information about a user's consumption of a first content item. The received data may be dependent on the type of content item, the type of sensor, and the manner of consumption of the content item by the user. For example, the content item may be audio data or an audio file, video data or a video file, text in any form or format, or a web page or multiple web pages. In other examples, the content item may be non-electronic information such as information about a user's physical exposure to a content item or information about a conversation a user had with another person regarding the content item. Information received at step 234 may further include time and date information for consumption of the content item, location information for consumption of the content item, identification of the user and other persons present during the consumption of the content item, and other information that may be collected by a wide variety of sensors.

At step 236, the method 230 may include receiving data and other information about the user's response to the first content item. The received data, and the user's response, may take the widest variety of forms. In one example, the user forwards the first content item to another person. Forwarding the first content item may include sending the content item in an e-mail, sending the content item as an attachment to a short message or service (SMS) message, or another electronic format. Forwarding the content item may include writing an e-mail message or SMS message describing the content item. Forwarding the content item may further include speaking to another person, describing the content item.

In another example, the user's response may include saving the content item to the user device or in another location. In another example, the user's response may include a minimally detectible response. For example, the user may move the user's gaze across an image on a display screen of the user device, without stopping to read or further consume the content item represented by the image. Such limited engagement may be considered at least a part of the user's response to the content item.

Step 236 may further include collecting and storing the data and other information about the user's response in a database such as an ambient data consumption database. Stored information in the database may include information about the number of times a content item was consumed, an engagement score associated with consumption of the content item, and an active sharing score associated with the consumption of the content item.

At step 238, method 230 includes developing a prediction about the user's familiarity with the first content item. In examples, the step 238 includes generating a predicted knowledge score for the user, for the first content item. The predicted knowledge score may be generated in any suitable manner, using any suitable algorithm. The predicted knowledge score may generally be used to predict the user's knowledge based on the experience the user has had with a content item. Search experience with a content item includes both exposure to the content item as well as the user's response to the content item. Factors for calculating the predicted knowledge score may include how many times the content has been presented to the user and how engaged the user has been with the content based on sensed attention data such as eye contact with another person or gave data on a display.

Also, step 238 may include monitoring the user's own generated content after consuming the original content to detect if the user reinforces their knowledge of the content through means such as forwarding the content or relating the subject matter of the content. This may include forwarding content to another party by creating either electronic content or real-life content, such as spoken conversation. The forwarded content may contain content that is substantially the same as the original consumed content. This may be detected by various sensors and used to predict the user's familiarity with the content item.

The prediction about the user's familiarity with the content item or the predicted knowledge score may be used in any suitable manner. At step 240, the method 230 includes selecting further content for the user based on the predicted knowledge score. For example, the user's prediction may show a strong interest in a particular content, content type, or content subject. Based on the prediction, similar content may be selected and provided to the user. On the other hand, the prediction for the user may show an aversion to or lack of interest in a particular content item, such as where the user did not engage with the content item much or at all. In such an example, the aversion will be reflected in the predicted knowledge score. The predicted knowledge score will then be used in making a further selection, which will likely not include similar content.

Step 242 illustrates another use of the predicted knowledge score. In this example, content may be selected to provide to the user. However, the information about the user's knowledge and preferences may be used to modify the content that has been selected in order to improve the likelihood of engagement with the content by the user. For example, the user's response to content items may indicate that the user has an unconscious preference for advertisements featuring the color yellow. Based on this conclusion and as reflected in the predicted knowledge score, further advertisements may be modified visually to include more of the yellow color to enhance the user's response to the further advertisements and likelihood of interaction therewith. Similarly, the user's past content consumption, as reflected in the predicted knowledge score, may indicate a strong preference for video content items. Based on this, a static image may be modified in order to produce a video or a video-like content item for presentation to the user.

Thus, the content is modified based on the user's knowledge of content item, in order to improve the likelihood of the user engaging with the content item. Moreover, the modification improves the enjoyment from and benefits the user from consumption of that content item as modified.

At step 244, the content item is conveyed to the user. For example, the content item may be communicated over a cellular network to a user device maintained by the user. In some examples, the content item may be combined with other content items for presentation to the user. For example, if the selected content item for the user is a news story, the news story content item may be included in a list or scroll of headlines of news stories that is provided to the user at the user device period.

Processing of the method 230 may continue with receiving sensor information about the user's actions and the user's responses to content items, predicting the user's knowledge level about a particular content item, and modifying or selecting further content for the user.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2M:
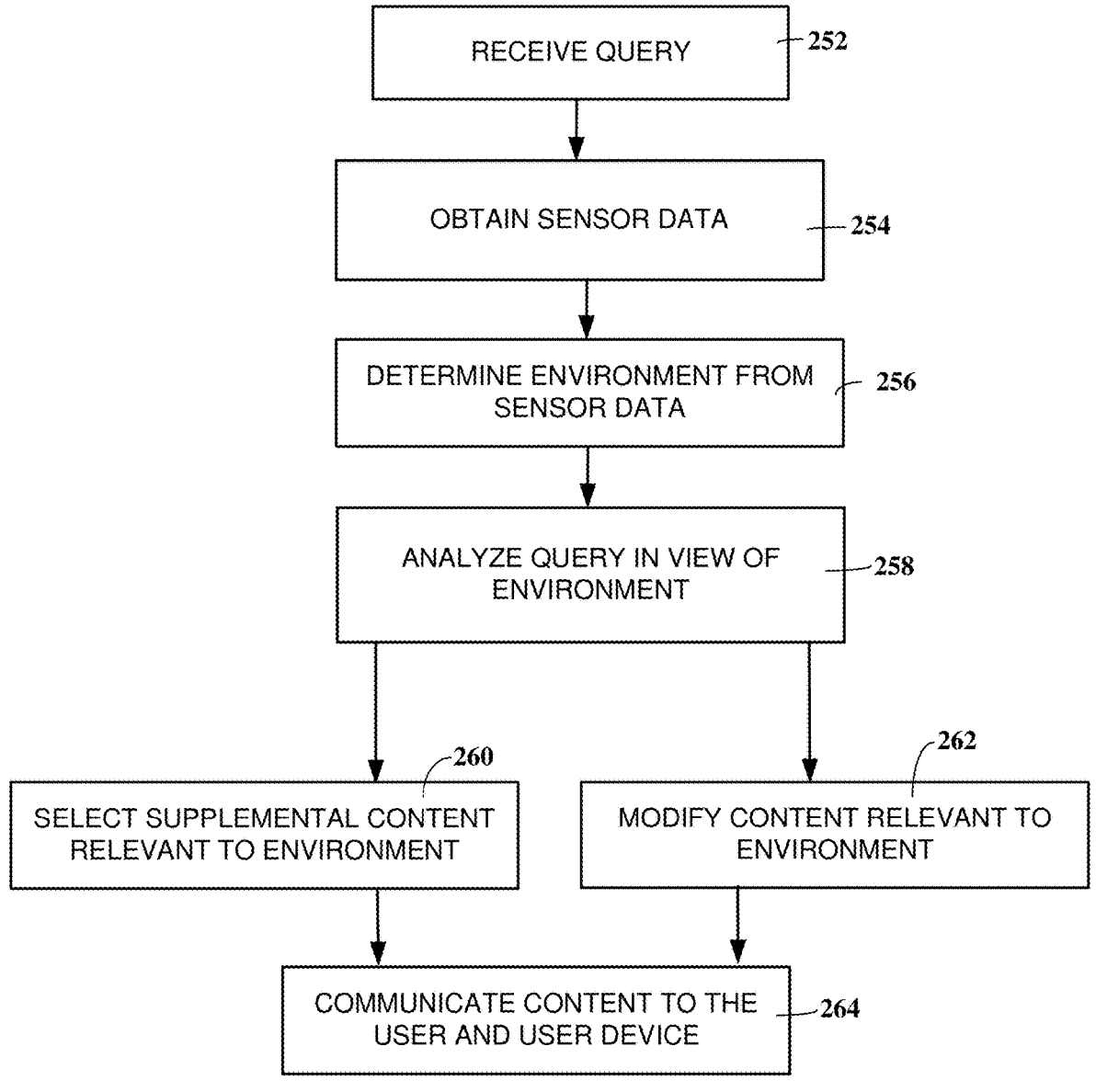
FIG. 2M depicts an illustrative embodiment of a method in accordance with various aspects described herein.

FIG. 2M depicts a flow diagram 250 illustrating a method for generating content relevant to an ambient environment in response to a user-generated query. The method involves several steps, each corresponding to specific operations performed by the system components described in the subject disclosure.

At step 252, the method begins with receiving a query from the user device 204e. For example, in FIG. 2H, the user generates a query 220a asking, "Why are my plants dying?"

Similarly, in FIG. 2J, a police officer generates a query 222a asking, "What happened here?"

At step 254, the system obtains sensor data from various sensors. This includes data from on-board sensors 204g on the user device 204e and external sensors 204j registered in the sensor registration database 204b. For instance, in FIG. 2I, the ambient data capture server 204a collects data from cameras, microphones, pressure sensors, touch sensors, light sensors, motion sensors, and temperature sensors.

At step 256, the system determines the ambient environment from the collected sensor data. This involves analyzing the sensor data to understand the conditions around the user device 204e. For example, in FIG. 2H, the system determines that the plants are affected by an extreme freeze, excess rain, and less sunlight. The sensor data can be collected at any timeframe that is relevant to the query. Similarly, the geographic range from a location of the user device 204e can vary depending on its relevance to the query.

At step 258, the system analyzes the query in view of the determined environment. This step involves contextualizing the query based on the ambient conditions. For instance, in FIG. 2K, the system analyzes the query "Have you seen Monet's Bouquet of Sunflowers?" in the context of the user's environment and historical content consumption.

At step 260, the system selects supplemental content relevant to the environment. This involves choosing content that addresses the user's query and is pertinent to the detected conditions. For example, in FIG. 2I, the system provides supplemental content 220d that includes information about deer eating the plants, in addition to environmental factors.

Alternatively, at step 262, the system may modify existing content to make it relevant to the environment. This involves adjusting the content to better suit the user's context. For example, in FIG. 2K, the system might modify the content to include additional information about Monet's Bouquet of Sunflowers, such as exhibition details and ticket information, based on the knowledge score of the individuals involved in the conversation.

Finally, at step 264, the system communicates the selected or modified content to the user via the user device 204e. This ensures that the user receives relevant and actionable information. For instance, in FIG. 2J, the police officer receives a detailed timeline and analysis of the events leading to a possible road rage incident and carjacking, presented as supplemental content 222b.

This flow diagram 250 provides a structured approach to generating and delivering content that is highly relevant to the user's ambient environment and specific queries, enhancing the overall user experience.

It will be appreciated that the flow diagram 250 can be adapted with other embodiments that are contemplated by the subject disclosure. For example, the subject disclosure includes several embodiments that build upon the primary system, each adding specific features and functionalities to enhance its capabilities. In the embodiments described below, the term "user equipment" can represent any computing and communications device that may be used by a user (e.g., smartphone, smart TV, tablet, computer, automobile dashboard, etc.).

In one embodiment, the content generation process involves detecting an activity at the user equipment, identifying the context of the activity, and generating content based on the user-generated query, the identified context, and its relevance to the ambient environment. For example, if a user is taking a picture of a plant, the system can identify this activity and provide relevant gardening tips.

Another embodiment details that the sensor data can include various types of data such as audible data, visual data, ambient condition data, location data, or combinations thereof. This allows the system to gather comprehensive information about the user's environment. For instance, the system can use data from a light sensor, a temperature sensor, and a microphone to determine the conditions affecting a plant's health.

Further, the ambient condition data can be supplied by specific types of sensors, including pressure sensors, touch sensors, light sensors, motion sensors, and temperature sensors. This ensures that the system can accurately capture a wide range of environmental conditions.

Another embodiment distinguishes between local sensors that are part of the user equipment and discoverable sensors that are not an integral part of the user equipment. This enables the system to utilize both on-board and external sensors to gather data. For example, a user's smartphone can use its built-in camera and microphone, as well as data from nearby public sensors like traffic cameras.

In another embodiment, the system analyzes historical content consumed at the user equipment to generate a knowledge score of the subject matter associated with the consumed content. This allows the system to tailor the generated content based on the user's familiarity with the topic. For instance, if a user frequently reads articles about gardening, the system can provide more advanced gardening tips.

Another embodiment involves analyzing historical locations of the user equipment to generate a predicted location and tailor the content accordingly. This can be useful for providing location-specific information. For example, if a user often visits a particular park, the system can provide updates about events or conditions in that park.

The content generated by the system can be in various forms, including audible content, visual content, textual content, or combinations thereof. It can also be presented as supplemental content to other content being presented at the user equipment. For instance, while a user is watching a video about plant care, the system can provide additional text tips on the screen.

In another embodiment, a portion of the sensor data can be received prior to the user equipment entering the location. This allows the system to provide contextually relevant content based on historical data. For example, the system can use past weather data to explain current plant conditions.

Additionally, the system can discover sensors within a threshold range of the user equipment, ensuring that the data collected is relevant to the user's immediate environment. This enhances the accuracy and relevance of the generated content.

The subject disclosure can include several alternate embodiments that enhance the system's capabilities for generating content relevant to an ambient environment in response to a user-generated query.

In one embodiment, the system begins by receiving a user-generated query from user equipment. For example, a user might ask, "What is the best route to avoid traffic?" This query prompts the system to gather and analyze data to provide a relevant response.

Next, the system obtains consumption data within a geographic region of the user equipment. Consumption data can refer to among other things information about the user's interactions with various types of content, such as navigation history, traffic updates, or local news. For instance, if the user has been frequently checking traffic updates or using navigation apps, this data would be part of the consumption data.

The system then determines an environmental profile of the user equipment based on the consumption data. This profile includes various environmental factors that may influence the content generated for the user. For example, the environmental profile might include data about current traffic conditions, road closures, and weather conditions that could affect travel.

Finally, the system generates content for presentation at the user equipment that is responsive to the user-generated query and relevant to the environmental profile. This content can be tailored to the user's specific query and the conditions detected in their environment. For instance, the system might generate a recommended route that avoids traffic congestion and takes into account current road closures and weather conditions.

Additional steps in the method include detecting an activity at the user equipment, identifying the context of the activity, and generating content based on the user-generated query, the identified context, and relevance to the environmental profile. For example, if the user is driving and the system detects this activity, it can provide real-time traffic updates and alternative routes.

The system may also analyze historical content consumed at the user equipment to generate a knowledge score associated with the consumed content. This score reflects the user's familiarity with the topic. For instance, if a user frequently checks traffic updates and uses navigation apps, the system can provide more advanced and detailed traffic information based on the user's knowledge score.

Furthermore, the system can generate a predicted location of the user equipment based on historical locations and use this predicted location to make the content more relevant to the user's current context. For example, if a user often travels to a specific area for work, the system can provide updates about traffic conditions and road closures in that area.

In another embodiment, the system could be used in a retail setting. For example, a user might ask, "Are there any sales on electronics nearby?" The system would gather data about the user's shopping history, preferences, and current location. It would then generate a list of nearby stores with ongoing sales on electronics, taking into account the user's past purchases and preferences.

Another example could involve a user asking, "What are some good hiking trails around here?" The system would analyze the user's past outdoor activities, preferences, and current location. It would then generate a list of recommended hiking trails nearby, including information about trail difficulty, length, and current weather conditions. Furthermore, the system can generate a predicted location of the user equipment based on historical locations and use this predicted location to make the content more relevant to the user's current context. For example, if a user often visits a particular park, the system can provide updates about events or conditions in that park.

The foregoing embodiments are contemplated by the subject disclosure as adaptations of FIG. 2M.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
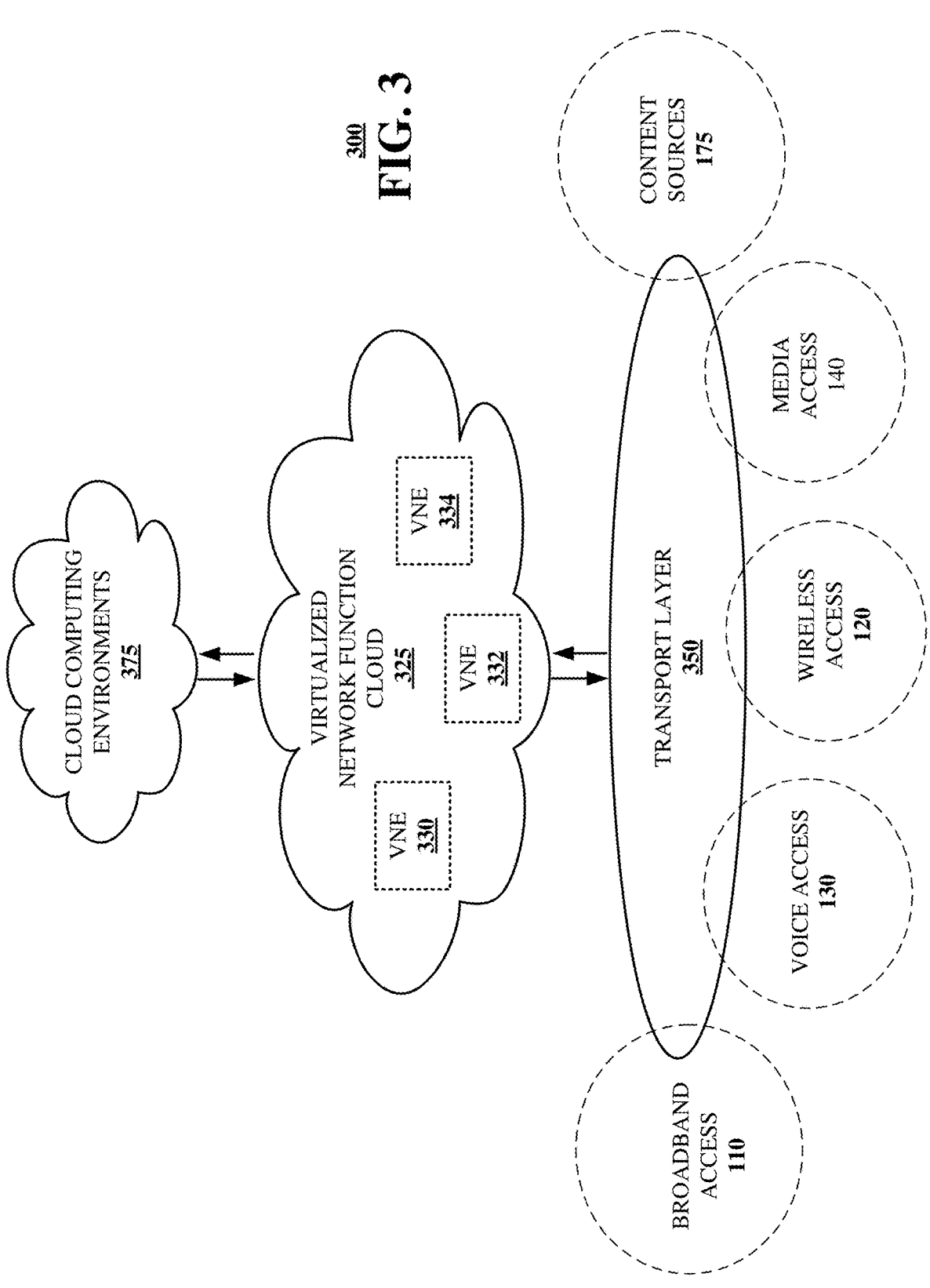
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of sensor 200, system 204, and method 230, 250 presented in FIG. 1, FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M and FIG. 3. For example, virtualized communication network 300 can facilitate in whole or in part collecting sensor data about a user in an environment, collecting information about the user's response to a content item, and predicting the user's familiarity with a further content item based on the user's response to the content item.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
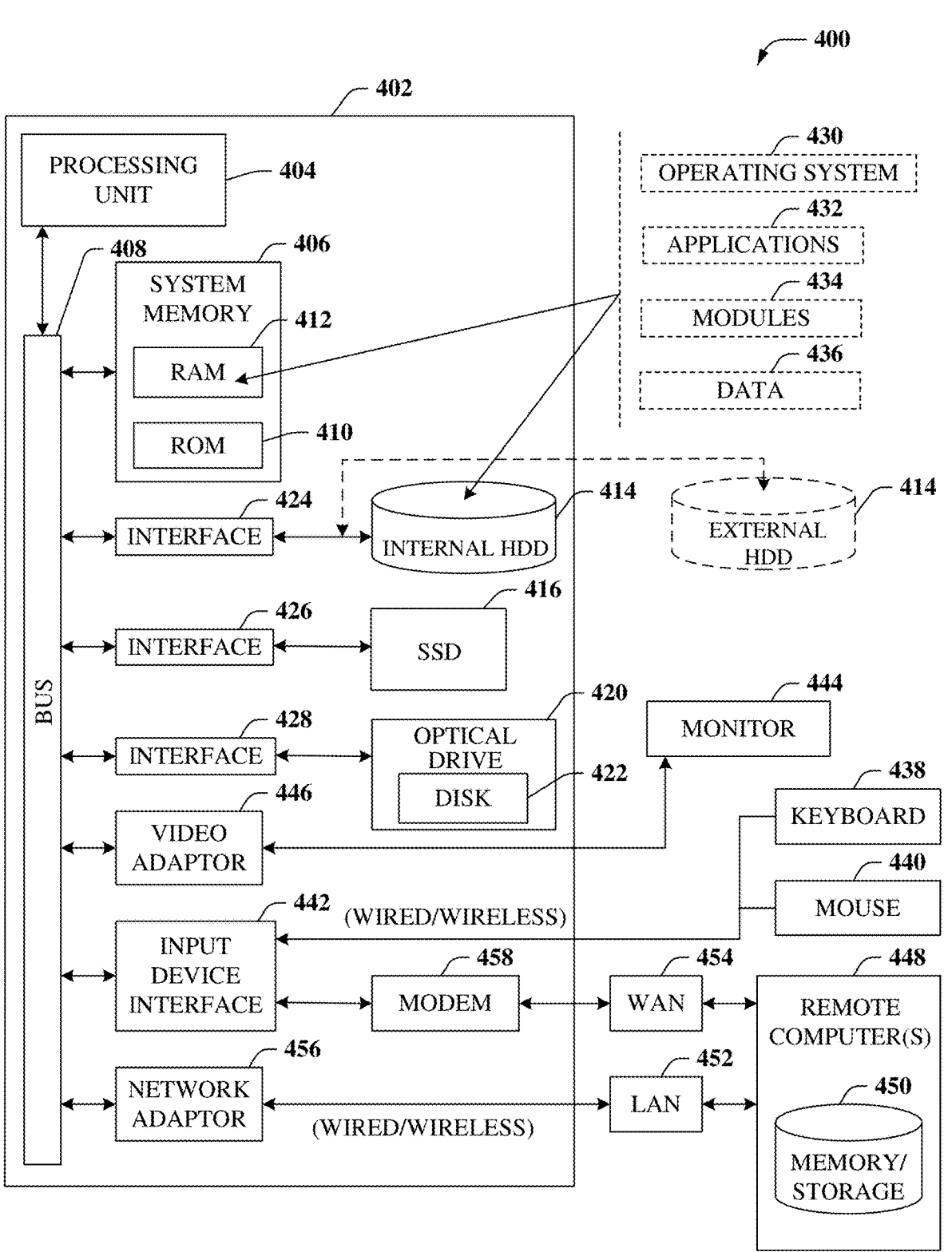
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting sensor data about a user in an environment, collecting information about the user's response to a content item, and predicting the user's familiarity with a further content item based on the user's response to the content item.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a solid state drive (SSD) 416, (e.g., to read from or write to) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
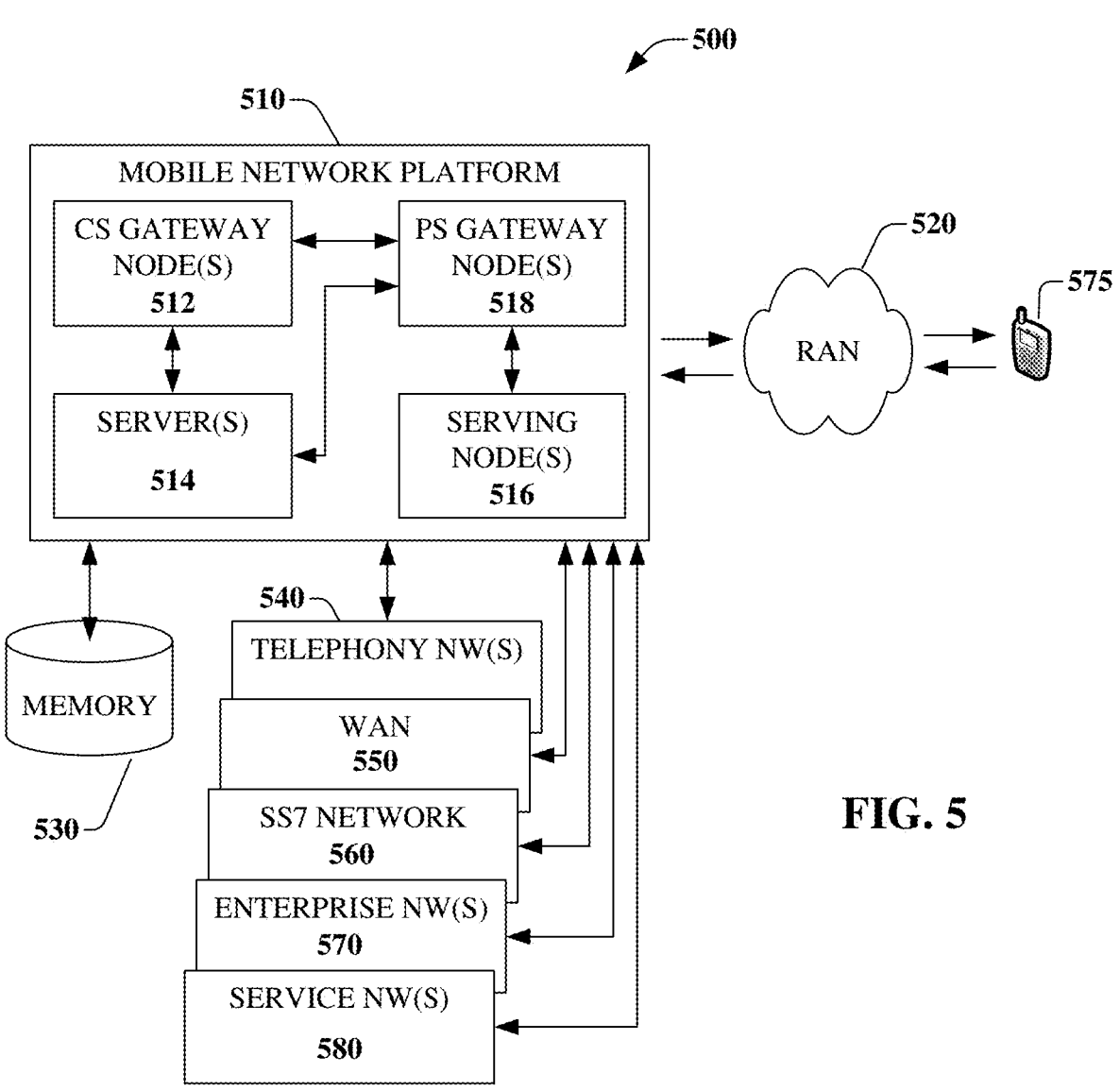
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting sensor data about a user in an environment, collecting information about the user's response to a content item, and predicting the user's familiarity with a further content item based on the user's response to the content item. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
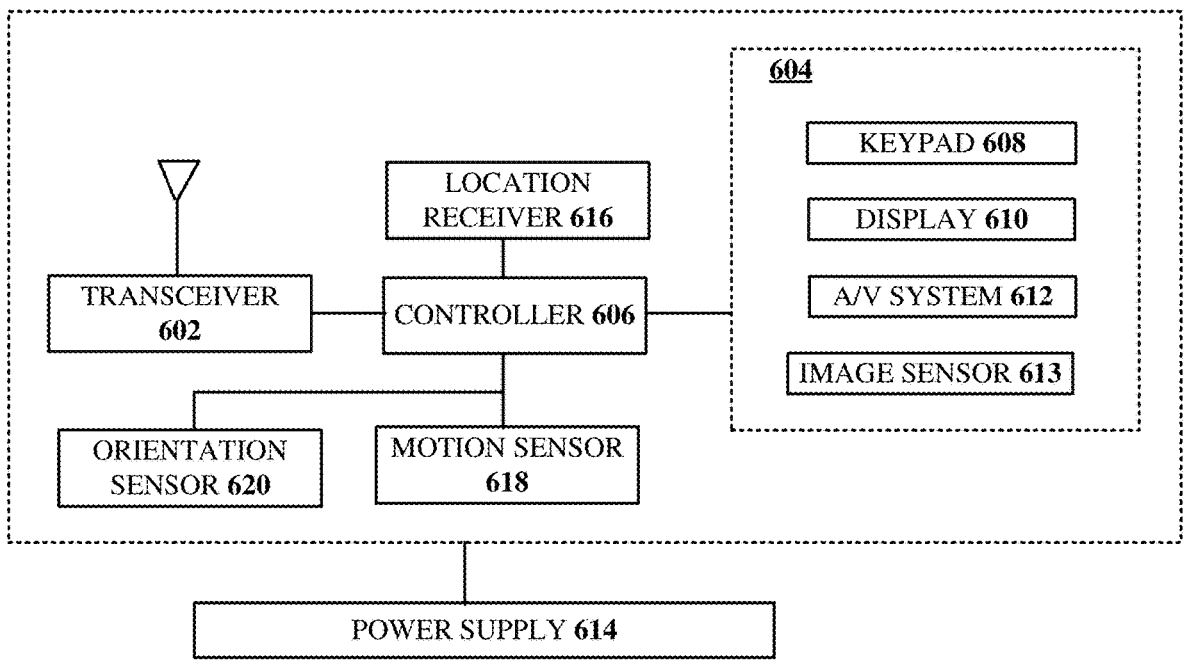
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part collecting sensor data about a user in an environment, collecting information about the user's response to a content item presented at a user device such as the communication device 600, and predicting the user's familiarity with a further content item based on the user's response to the content item.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device

600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
registering one or more sensors in a database, wherein the registering comprises storing, in a sensor record for each respective sensor of the one or more sensors, a sensor identifier, a sensor type, sensor location information, sensor range information, and a sensor status;

receiving, from the one or more sensors, sensor data;
receiving a user-generated query from user equipment;
responsive to the user-generated query:
determining a threshold range associated with a location of the user equipment;
identifying, from the database, at least a portion of the one or more sensors having sensor range information that intersects the threshold range associated with the location of the user equipment;
determining from the sensor data an ambient environment based on the threshold range associated with the location of the user equipment; and
generating content for presentation at the user equipment that is responsive to the user-generated query and relevant to the ambient environment.

2. The device of claim 1, wherein the generating the content comprises:
detecting an activity at the user equipment;
identifying a context of the activity; and
generating the content based on the user-generated query, the identified context and relevance to the ambient environment.

3. The device of claim 1, wherein the sensor data comprises audible data, visual data, ambient condition data, location data, or combinations thereof.

4. The device of claim 3, wherein the ambient condition data is supplied by a pressure sensor, a touch sensor, a light sensor, a motion sensor, a temperature sensor, or combinations thereof.

5. The device of claim 1, wherein a first portion of the one or more sensors comprises one or more local sensors of the user equipment and wherein a second portion of the one or more sensors comprises one or more discoverable sensors not an integral part of the user equipment.

6. The device of claim 1, wherein the generating the content comprises:
analyzing historical content consumed at the user equipment;
generating a knowledge score of subject matter associated with the historical content; and
generating the content based on the user-generated query, the knowledge score and relevance to the ambient environment.

7. The device of claim 1, wherein the generating the content comprises:
analyzing historical locations of the user equipment;
generating a predicted location of the user equipment based on the historical locations; and
generating the content based on the user-generated query, the predicted location and relevance to the ambient environment.

8. The device of claim 1, wherein the content comprises audible content, visual content, textual content, or combinations thereof, and wherein the content is presented as supplemental content to other content being presented at the user equipment.

9. The device of claim 1, wherein a portion of the sensor data is received prior to the user equipment entering the location.

10. The device of claim 1, wherein the registering the one or more sensors comprises discovering the one or more sensors within the threshold range of the user equipment, and wherein the threshold range of the user equipment is within a discoverable range of the one or more sensors.

11. A non-transitory, machine-readable medium, comprising executable instructions that, when executed by a processing system including a processor, facilitate performance of operations, the operations comprising:

receiving, from one or more sensors, sensor data;

receiving a user-generated query from user equipment;

responsive to the user-generated query:

determining from the sensor data an ambient environment associated with a threshold range of a location of the user equipment; and generating content for presentation at the user equipment that is responsive to the user-generated query and relevant to the ambient environment, wherein the generating content comprises selecting supplemental content relevant to the ambient environment, and communicating the supplemental content to the user equipment.

12. The non-transitory, machine-readable medium of claim 11, wherein the generating the content comprises:

detecting an activity at the user equipment;

identifying a context of the activity; and generating the content based on the user-generated query, the identified context and relevance to the ambient environment.

13. The non-transitory, machine-readable medium of claim 11, wherein the generating the content comprises:

analyzing historical content consumed at the user equipment;

generating a knowledge score of subject matter associated with the historical content; and generating the content based on the user-generated query, the knowledge score and relevance to the ambient environment.

14. The non-transitory, machine-readable medium of claim 11, wherein the generating the content comprises:

analyzing historical locations of the user equipment;

generating a predicted location of the user equipment based on the historical locations; and generating the content based on the user-generated query, the predicted location and relevance to the ambient environment.

15. The non-transitory, machine-readable medium of claim 11, wherein the content comprises audible content, visual content, textual content, or combinations thereof.

16. The non-transitory, machine-readable medium of claim 11, wherein the content is presented as supplemental content to other content being presented at the user equipment.

17. A method, comprising:

receiving, by a processing system including a processor, a user-generated query from user equipment;

responsive to the user-generated query:

obtaining, by the processing system, consumption data within a geographic region of the user equipment;

determining, by the processing system, from the consumption data an environmental profile of the user equipment;

determining, by the processing system, from the consumption data and the environmental profile, a timeline of events associated with the geographic region; and generating, by the processing system, content for presentation at the user equipment that is responsive to the user-generated query and relevant to the environmental profile, wherein the generating the content comprises generating the content including the timeline of events associated with the geographic region.

18. The method of claim 17, wherein the generating the content comprises:

detecting an activity at the user equipment;

identifying a context of the activity; and generating the content based on the user-generated query, the identified context and relevance to the environmental profile.

19. The method of claim 17, wherein the generating the content comprises:

analyzing historical content consumed at the user equipment;

generating a knowledge score associated with the historical content; and generating the content based on the user-generated query, the knowledge score and relevance to the environmental profile.

20. The method of claim 17, wherein the generating the content comprises:

generating a predicted location of the user equipment based on historical locations of the user equipment; and generating the content based on the user-generated query, the predicted location and relevance to the environmental profile.

* * * * *